(12) United States Patent
Caroleo et al.

(10) Patent No.: US 10,597,225 B2
(45) Date of Patent: Mar. 24, 2020

(54) TRUCK BODY

(71) Applicant: GECKO TANKS PTY LTD, Welshpool, Western Australia (AU)

(72) Inventors: Domenic Caroleo, Welshpool (AU); Steve Sikirich, Attadale (AU)

(73) Assignee: GECKO TANKS PTY LTD, Welshpool, Western Australia (AU)

( * ) Notice: Subject to any disclaimer, the term of this patent is extended or adjusted under 35 U.S.C. 154(b) by 1040 days.

(21) Appl. No.: 14/363,636

(22) PCT Filed: Dec. 6, 2012

(86) PCT No.: PCT/AU2012/001505
§ 371 (c)(1),
(2) Date: Jun. 6, 2014

(87) PCT Pub. No.: WO2013/082674
PCT Pub. Date: Jun. 13, 2013

(65) Prior Publication Data
US 2014/0361019 A1 Dec. 11, 2014

(30) Foreign Application Priority Data

Dec. 6, 2011 (AU) .................................. 2011905070

(51) Int. Cl.
*B64D 37/00* (2006.01)
*B65D 90/00* (2006.01)
*B60P 3/24* (2006.01)

(52) U.S. Cl.
CPC ................ *B65D 90/00* (2013.01); *B60P 3/24* (2013.01); *Y10T 29/49716* (2015.01)

(58) Field of Classification Search
CPC ........ B65D 90/00; B65D 88/12; B65D 25/04; B60P 3/24; B60P 3/00; B60P 3/22; B60P 3/243; Y10T 29/49716; B60K 15/03
(Continued)

(56) References Cited

U.S. PATENT DOCUMENTS 1,235,128 A * 7/1917 Frank .................... B65D 90/06
  105/357
1,608,224 A * 11/1926 Mauran .................... B61D 5/02
  105/358

(Continued)

FOREIGN PATENT DOCUMENTS

CN   2352806    * 12/1999   ............. B65D 88/12
CN   2352806 Y    12/1999
(Continued)

OTHER PUBLICATIONS

International Search Report for PCT/AU2012/001505, ISA/AU, Woden ACT, AU, dated Feb. 12, 2013.
(Continued)

*Primary Examiner* — Andrew T Kirsch
*Assistant Examiner* — Elizabeth J Volz
(74) *Attorney, Agent, or Firm* — Harness, Dickey & Pierce, P.L.C.

(57) ABSTRACT

A tank 14 for storing at least one fluid comprising a main chamber 18 and at least one sub-chamber 26 having an exterior surface defining an inner volume of the at least one sub-chamber 26, the at least one sub-chamber 26 being arranged with respect to the main chamber 18 such that at least one first location of the exterior surface may be accessed from the interior of the main chamber 18 and at least one second location of the exterior surface may be accessed from a location exterior to the main chamber 18. There is also provided a method for manufacturing the tank 14.

16 Claims, 15 Drawing Sheets

(58) Field of Classification Search
USPC ...... 220/564, 563, 562, 23.4, 4.12; 280/838; 137/267, 571, 576, 584
See application file for complete search history.

(56) References Cited

U.S. PATENT DOCUMENTS

| | | | | |
|---|---|---|---|---|
| 1,608,226 | A * | 11/1926 | Mauran | B61D 5/02 105/358 |
| 1,685,105 | A * | 9/1928 | Thompson | B61D 5/02 105/360 |
| 2,285,543 | A * | 6/1942 | Thomas | B60P 3/221 220/DIG. 24 |
| 2,297,840 | A * | 10/1942 | Pfeiffer | B60P 3/243 220/563 |
| 2,703,607 | A * | 3/1955 | Simmonds | B64D 37/08 137/265 |
| 3,168,904 | A * | 2/1965 | Conover | B60K 15/03 137/264 |
| 4,435,196 | A | 3/1984 | Pielkenrood | |
| 4,874,107 | A | 10/1989 | Arnau-Munoz et al. | |

FOREIGN PATENT DOCUMENTS

| | | |
|---|---|---|
| CN | 201525601 U | 7/2010 |
| FR | 2797236 A1 | 2/2001 |
| WO | WO-2009114754 A1 | 9/2009 |

OTHER PUBLICATIONS

Written Opinion of the International Searching Authority for PCT/AU2012/001505, dated Feb. 12, 2013.
Written Opinion of the International Preliminary Examining Authority for PCT/AU2012/001505, dated Jan. 13, 2014.
International Preliminary Report on Patentability (Chapter II of the Patent Cooperation Treaty), dated Mar. 28, 2014 with annexes.

* cited by examiner

TRUCK BODY

CROSS-REFERENCE TO RELATED APPLICATIONS

This application is a U.S. National Phase Application of PCT/AU2012/001505, filed on Dec. 6, 2012 and published in English as WO/2013/082674 on Jun. 13, 2013. The application claims priority to Australian Application No. 2011905070, filed on Dec. 6, 2011. The entire disclosures of the above references are incorporated herein by reference.

TECHNICAL FIELD

The present invention relates to apparatus and methods for handling fluids.

The invention has been devised particularly, although not necessarily solely, in relation to tanks for storing, transporting and delivering of fluids such as fuels, oils and water.

BACKGROUND ART

The following discussion of the background art is intended to facilitate an understanding of the present invention only. The discussion is not an acknowledgement or admission that any of the material referred to is or was part of the common general knowledge as at the priority date of the application.

Manufacture of tanks typically is a cumbersome procedure which typically requires relatively large working areas and a relatively large number of personnel. This is particularly true if several different types of trucks are to be manufactured. For example, on occasions it may be necessary to manufacture tanks for storing and transporting a single type of fluid. An example of such a tank is a water tank. On other occasions, tanks may comprise a plurality of chambers for storing different type of fluids. Examples of these tanks are the ones incorporated onto service trucks.

Each of these different types of tanks are currently manufactured from scratch. This means that in order to manufacture a tank for storing a single liquid the main chamber of the tank needs to be manufactured and then customized to become, for example, a water tank. If a tank for a service truck is required, the plurality of chambers of the tank need to be manufactured. The plurality of chambers need then be customized to become a tank for a service truck.

It is against this background that the present invention has been developed.

SUMMARY OF INVENTION

According to a first aspect of the invention there is provided a tank for storing at least one fluid comprising a main chamber and at least one sub-chamber having an exterior surface defining an inner volume of the at least one sub-chamber, the at least one sub-chamber being arranged with respect to the main chamber such that at least one first location of the exterior surface may be accessed from the interior of the main chamber and at least one second location of the exterior surface may be accessed from a location exterior to the main chamber.

Preferably, the main chamber comprises an exterior surface defining an inner volume containing the at least one sub-chamber wherein the exterior surface comprises at least one aperture adapted to receive the at least one second location of the exterior surface of the at least one sub-chamber.

Preferably, the at least one sub-chamber comprises an internal chamber incorporated within the main chamber.

Preferably, the internal chamber is of cylindrical configuration.

Preferably, the at least one internal chamber is adapted and arranged within the main chamber to reduce movement of the fluid during transportation of the fluid within the tank.

Preferably, the internal chamber is arranged within the main chamber such that it is surrounded in its entirety by the fluid incorporated within the main chamber.

Preferably, the tank is adapted to provide fluid to the at least one internal chamber from a fluid source exterior to the main chamber.

In one arrangement, the at least one first location of the exterior surface comprises a port to allow fluid communication between the main chamber and the at least one sub-chamber.

In an alternative arrangement, the at least one second location of the exterior surface comprises an aperture to allow fluid communication between a fluid source exterior to the main chamber and the at least one sub-chamber.

Preferably, the at least one internal chamber comprises first and second ends, the at least one internal chamber being arranged within the main chamber such that the first end and the second end may be accessed from the exterior of the main chamber.

According to a second aspect of the invention there is provided a method for assembling a tank adapted to either incorporate a single fluid or to incorporate a plurality of fluids, the method comprising the steps of:

providing a tank structure having a main chamber and at least one sub-chamber having an exterior surface defining an inner volume of the at least one sub-chamber, the at least one sub-chamber arranged with respect to the main chamber such that at least one first location of the exterior surface may be accessed from the interior of the main chamber and at least one second location of the exterior surface may be accessed from a location exterior to the main chamber and providing at least one opening within the exterior surface to allow access of fluid into the at least one sub-chamber wherein the at least one opening openings may be provided at either the at least one first location to allow access of fluid of the main chamber into the sub-chamber so as to allow the tank to incorporate a single fluid or at the at least one second location to allow access of fluid from the a fluid source external to the main chamber so as to allow the tank to incorporate a plurality of fluids.

Preferably, the method further comprises attaching pre-fabricated items to the tank so as to customise the tank to becoming a tank adapted to either incorporate a single fluid or to incorporate a plurality of fluids.

In an arrangement, the pre-fabricated items comprise a pre-fabricated water spraying bar.

In an alternative arrangement, the pre-fabricated items comprise a pre-fabricated manifold and an attachment, the manifold comprising a plurality of conduits being adapted to be fluidly connected to the at least one second location of the exterior surface and the attachment defining a service area adapted to be in fluid communication with the manifold so as to deliver and receive fluid.

According to a third aspect of the invention there is provided a tank for storing at least one fluid comprising a main chamber and at least one sub-chamber, the sub-chamber comprising first and second ends wherein the at least one internal chamber is arranged within the main chamber such that the first end and the second end may be accessed from the exterior of the main chamber.

Preferably, the first and second ends are releasably closed so as to allow opening of the first end and second end.

Preferably, the first and second ends are adapted to be opened simultaneously. This arrangement is particularly useful because it facilitates cleaning of the at least one internal chamber by allowing delivery of cleaning fluid through the top end of the internal chamber and exiting of the cleaning fluid through the bottom end of the internal chamber.

Preferably, the at least one sub-chamber is of cylindrical configuration. This facilitates cleaning of the interior of the at least one sub-chamber.

Preferably, the main chamber comprises a top end and a bottom end, the first end of the internal chamber being located at the top end and the second end of the internal chamber being located at the bottom end.

According to a fourth aspect of the invention there is provided a tank for storing at least one fluid comprising a main chamber and at least one sub-chamber, the at least one sub-chamber being incorporated in its entirety inside the main chamber.

Preferably, the at least one sub-chamber is adapted for reducing movement of the fluid within the main chamber.

Preferably, the tank comprises means for reducing movement of the fluid within the main chamber.

Preferably, the means for reducing movement of the fluid within the main chamber comprises plates joining the at least one chamber with at least one wall of the main chamber.

Preferably, there are a plurality of sub-chambers incorporated inside the main chamber.

Preferably, the plurality of sub-chambers are attached to each other and are attached to the wall defining the main chamber through the means for reducing movement of the fluid within the main chamber.

Preferably, the means for reducing movement of the fluid within the main chamber comprises plates arranged at different locations with respect to the height of the plurality of sub-chambers.

Preferably, the plates are alternatingly attached to the upper portion and the lower portion of the sub-chambers.

Preferably, the means for reducing movement of the fluid within the main chamber are adapted to allow movement of maintenance personnel within the tank.

According to a fifth aspect of the invention there is provided a tank adapted to either incorporate a single fluid or to incorporate a plurality of fluids, the tank comprising a tank structure having a main chamber and at least one sub-chamber having an exterior surface defining an inner volume of the at least one sub-chamber, the at least one sub-chamber arranged with respect to the main chamber such that at least one first location of the exterior surface may be accessed from the interior of the main chamber and at least one second location of the exterior surface may be accessed from a location exterior to the main chamber and at least one opening within the exterior surface to allow access of fluid into the at least one sub-chamber wherein the at least one opening is located at either the at least one first location to allow access of fluid of the main chamber into the sub-chamber so as to allow the tank to incorporate a single fluid or at the at least one second location to allow access of fluid from the a fluid source external to the main chamber so as to allow the tank to incorporate a plurality of fluids.

Preferably, the tank further comprises pre-fabricated items to the tank so as to customise the tank to becoming a tank adapted to either incorporate a single fluid or to incorporate a plurality of fluids.

Preferably, the pre-fabricated item comprises a pre-fabricated water spraying bar.

Preferably, the pre-fabricated items comprise a pre-fabricated manifold and an attachment, the manifold comprising a plurality of conduits being adapted to be fluidly connected to the at least one second location of the exterior surface and the attachment defining a service area adapted to be in fluid communication with the manifold so as to deliver and receive fluid.

Preferably, the pre-fabricated items are configured such that the plurality of conduits can be fluidly connected to the at least one second location of the exterior surface and the manifold can be fluidly connected to the service area via tubes, wherein all of the tubes have the same length.

Preferably, the length of the tubes is about 400 mm.

According to a sixth aspect of the invention there is provided a truck incorporating a tank according to the first, third to fifth aspect of the invention.

According to a seventh aspect of the invention there is provided a tank for storing at least one fluid comprising a main chamber having an exterior surface defining an inner volume adapted to receive a first fluid, and at least one sub-chamber having an exterior surface defining an inner volume, the at least one sub-chamber having at least one first and second locations, the first location being adapted to be selectively displaced between an open condition and a closed condition to either allow or impede flow of the first fluid into the inner volume of the sub-chamber and the second location being adapted to be selectively displaced between an open condition and a closed condition to allow flow of a second fluid into the inner volume of the sub-chamber, wherein the sub-chamber is arranged with respect to the main chamber such that the first location may be accessed from a location within the main chamber and the second location may be accessed from the exterior of the chamber.

According to an eight aspect of the invention there is provided a tank for storing at least one fluid comprising a main chamber and at least one sub-chamber, the main chamber having an exterior surface defining an inner volume adapted to receive the fluid, the sub-chamber having an exterior surface defining an inner volume of the sub-chamber, the exterior surface of the sub-chamber comprising first and second ends adapted to be selectively displaced between an open condition and a closed condition, wherein the at least one sub-chamber is arranged within the inner volume of the main chamber in such a manner such that the first end and the second end may be accessed from the exterior of the main chamber.

According to a ninth aspect of the invention there is provided a tank for storing at least one fluid comprising a main chamber having an exterior surface defining an inner volume adapted to receive a first fluid, and at least one sub-chamber having an exterior surface, the sub-chamber being contained within the inner volume of the main chamber, wherein the sub-chamber is arranged within the main chamber such that external surface of the sub-chamber is surrounded by the fluid incorporated within the main chamber.

According to a tenth aspect of the invention there is provided a tank adapted to either incorporate a single first fluid or to incorporate the single first fluid and one or more second fluids, the tank comprising a tank structure having a main chamber comprising an external surface defining an inner volume adapted to receive the single first fluid, and at least one sub-chamber having an exterior surface defining an inner volume adapted to receive either the single first fluid or the one or more second fluids, the sub-chamber being arranged with respect to the main chamber such that at least one first location of the exterior surface of the sub-chamber may be accessed from the interior of the main chamber and at least one second location of the exterior surface of the sub-chamber may be accessed from a location exterior to the main chamber, wherein the first location comprises at least one first opening adapted to be selectively displaced between an open condition to allow access of the single first fluid into the sub-chamber and a closed condition to impede access of the single first fluid and wherein the second location comprises at least second opening adapted to be selectively displaced between an open condition and a closed condition to allow access of fluid from the a fluid source external to the main chamber so as to allow the tank to incorporate a fluid of the one of more fluids.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which.

DESCRIPTION OF EMBODIMENTS

Figure 1:
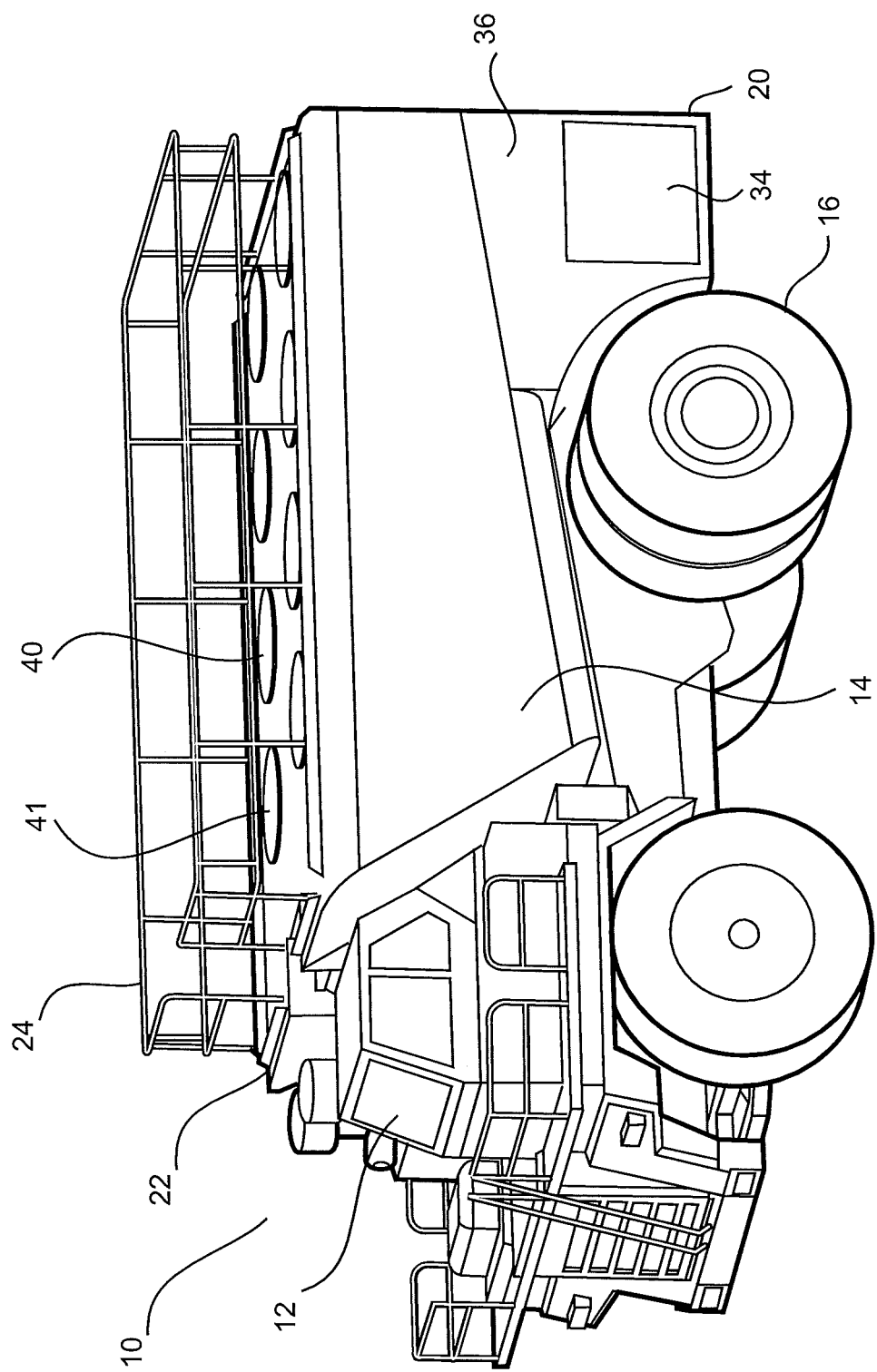
FIG. 1 is a perspective view of a truck incorporating a tank in accordance with an embodiment of the invention.
Figure 2:
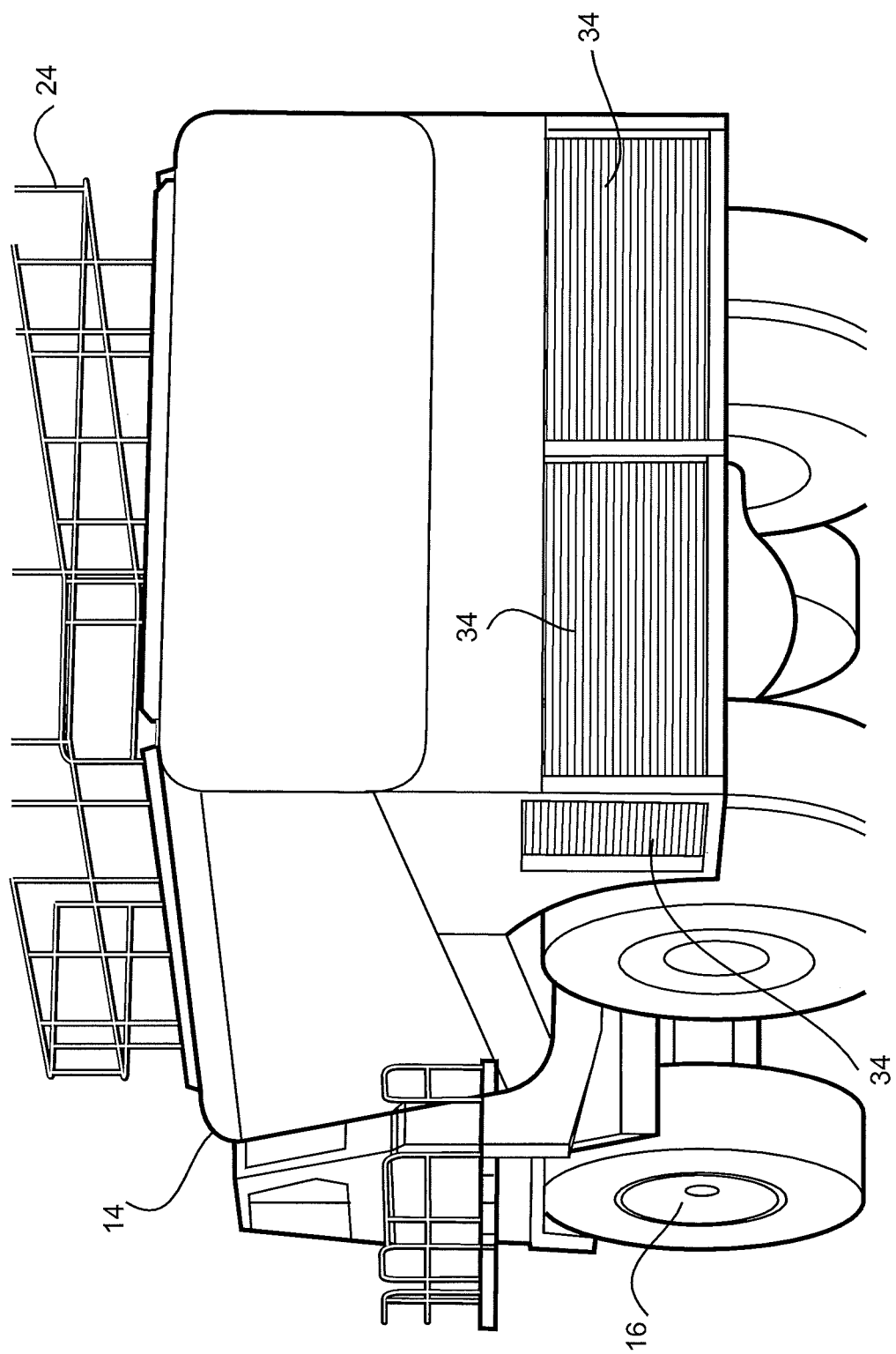
FIG. 2 is a rear perspective view of the truck shown in FIG. 1.
Figure 3:
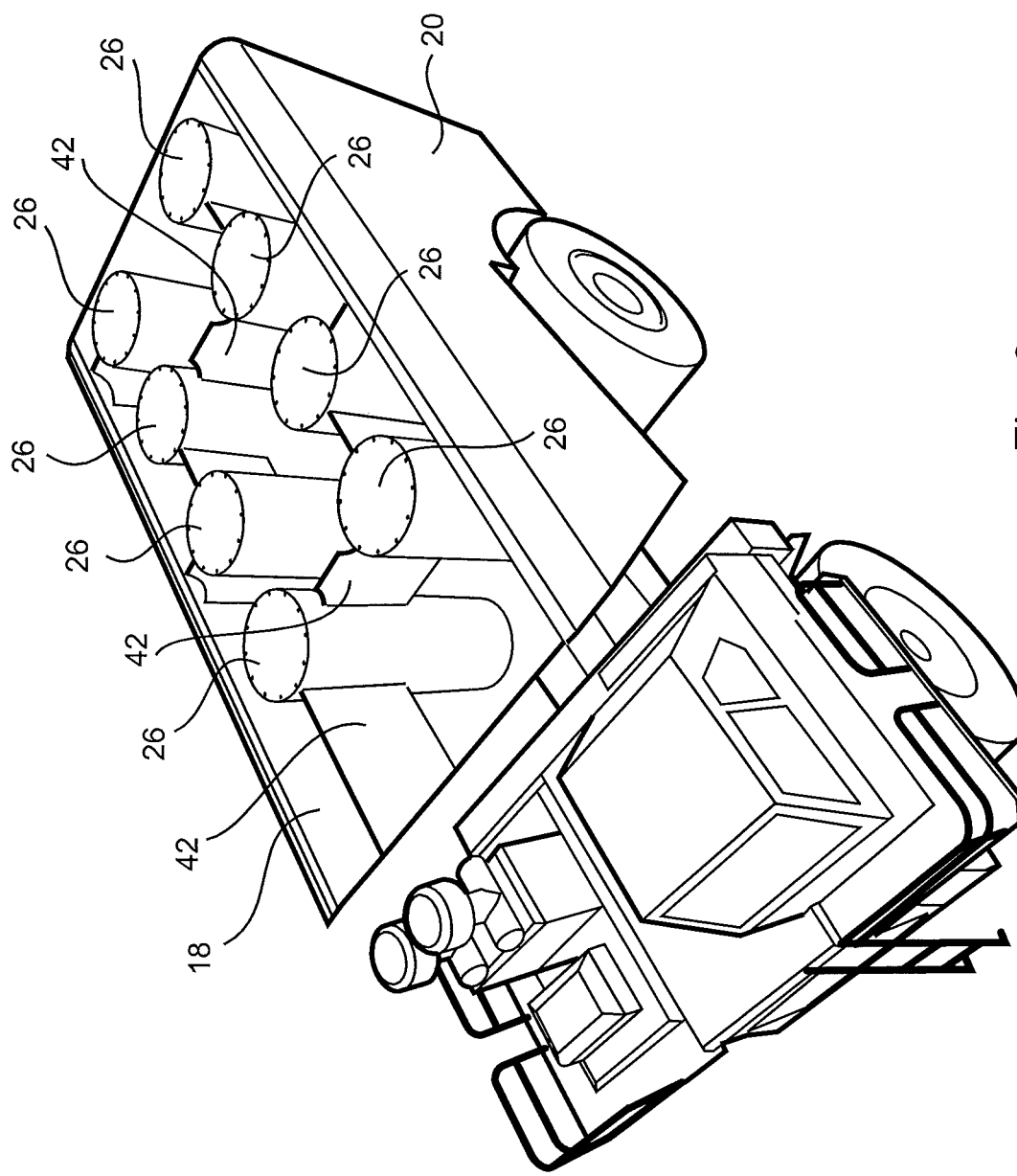
FIG. 3 is a top perspective view of the truck shown in FIG. 1 depicting the interior of the tank.

FIGS. 1 to 3 show a truck 10 in accordance with an embodiment of the invention. The truck 10 comprises a cab 12 and a tank 14. The cab 12 and the tank 14 are supported on a chassis of the truck 10. The cab 12 includes the compartment for the driver of the truck 14. The engine is located under the cab 12. Two pairs of wheels 16 are provided to allow displacement of the truck 10.

Figure 8:
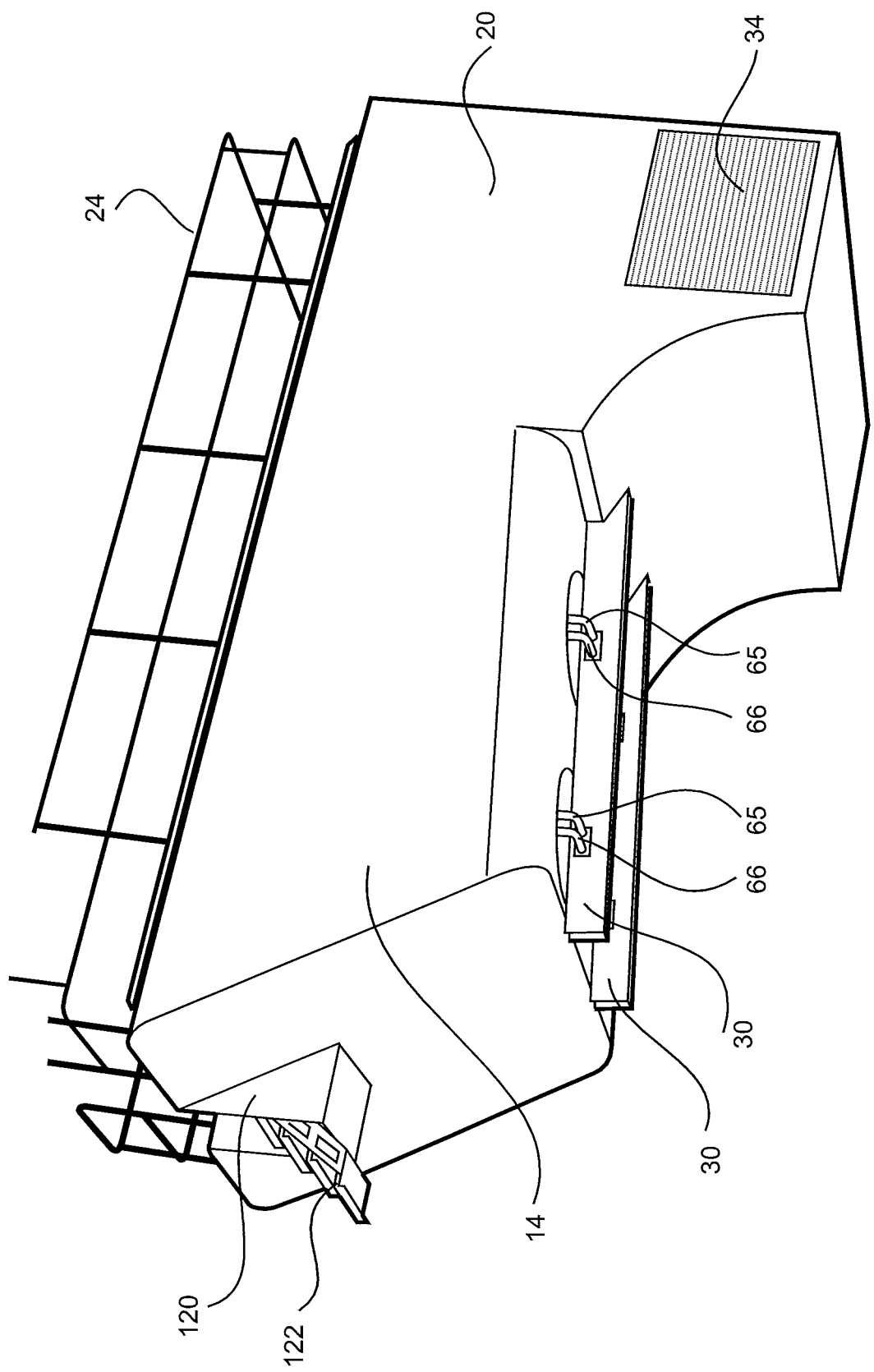
FIG. 8 is a front perspective view of the second arrangement of the tank incorporated in the truck shown in FIG. 1.
Figure 15:
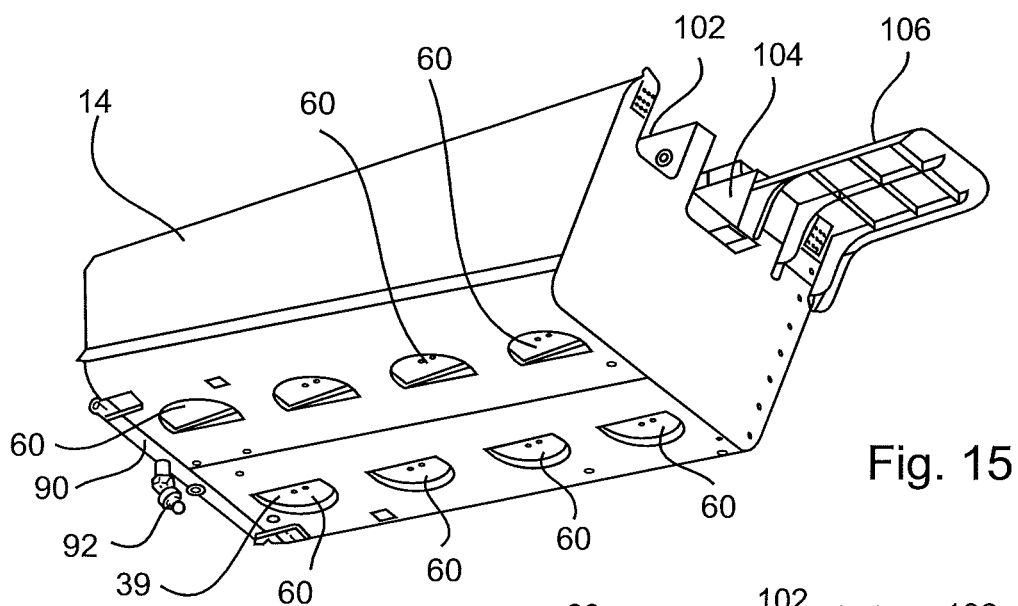
FIG. 15 is bottom perspective view of the an alternative arrangement of the tank in accordance with an embodiment of the invention.
Figure 16:
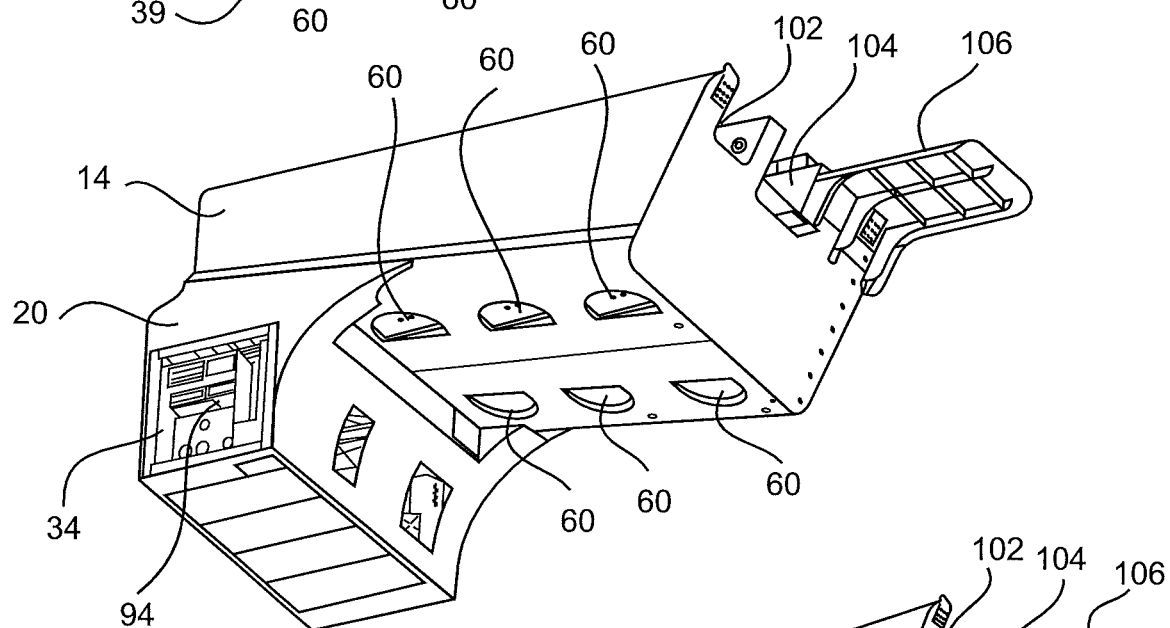
FIG. 16 is a is bottom perspective view of a further alternative arrangement of the tank in accordance with an embodiment of the invention.

The particular arrangement of the truck 10 shown in FIGS. 1 and 8 comprises stairs 122 to facilitate access to the upper surface of the tank 14. For this the front wall of the tank 14 comprises at least one cut out adapted to receive the stairs 122. FIGS. 15 to 16 show a further particular arrangement of a tank 14. As shown in, for example, FIG. 15, the front wall of the tank 14 comprises a plurality of cut outs 102 and 104. The cut outs 102 and 104 are adapted to receive inserts 120 (see FIG. 8) for supporting, for example, a compressor (not shown) and the stairs 122. The arrangement also shows a cabin hood 106 extending outward from the front wall of the tank 14, The cabin hood 106 is adapted to cover the tank driver's cabin.

FIGS. 4 to 8 and FIGS. 15 and 16 show two arrangements of the tank 14 incorporated in the truck 10 shown in FIGS. 1 to 3. As will be described in greater detail, in accordance with the present embodiment of the invention, the two arrangements of the tank 14 may be manufactured using the same type of tank structure 84. For this, the tank structure 84 is adapted to be customised to become either one of the two arrangements of the tank 14. The tank structure 84 is also adapted to receive a plurality of pre-fabricated parts in order to customise the tank 14. By applying specific pre-fabricated parts to the tank structure 84 any of the arrangements of the tank 14 may be manufactured. This is particularly advantageous because it allows manufacturing different types of tanks 14 in a relatively short period of time. Also, it reduces the working space and the number of personnel required for manufacturing the different type of tanks 14.

Referring to FIGS. 1 and 3, the tank 14 comprises a storage area 17. As will be described further one of the arrangements of the tank incorporates a service attachment 20. The storage area 17 is adapted to store fluids such as oil, fuels or water. The top portion 22 of the tank 14 provides a platform surrounded by a barrier 24. This area can be accessed from the cab 12 by the driver and users of the truck 10.

As will be described in greater detail, the storage area 17 of the tank 14 comprises a main chamber 18 and at least one sub-chamber chamber 26. The sub-chamber 26 comprises at least one internal chamber 26 incorporated within the main chamber 18. In accordance with the present embodiment of the invention, the at least one internal chamber 26 is contained in its entirety within the main chamber 18. In the arrangement shown in the figures, there are eight internal chambers 26. The internal chambers 26 are of cylindrical configuration.

Figure 18:
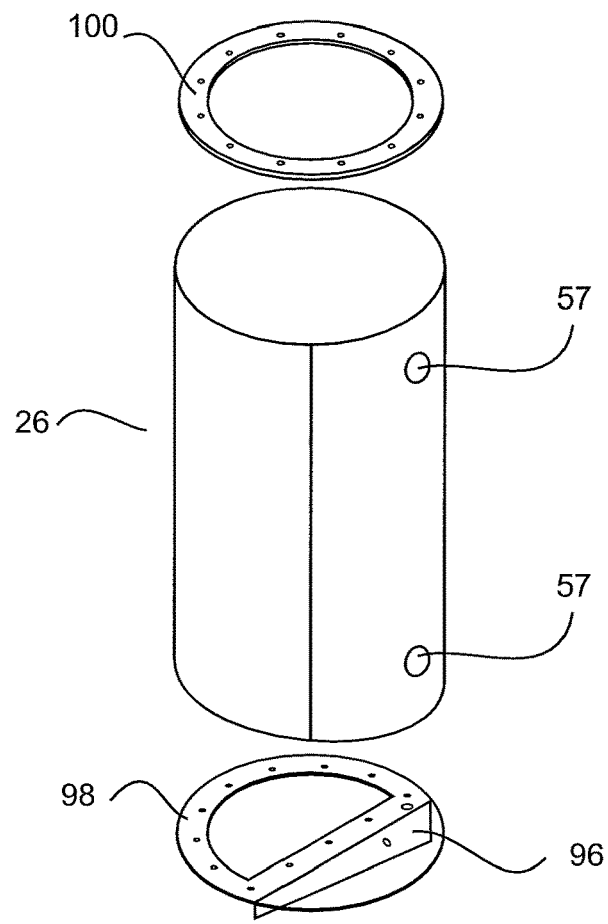
FIG. 18 shows an exploded view of an inner chamber in accordance with an embodiment of the invention.
Figure 19:
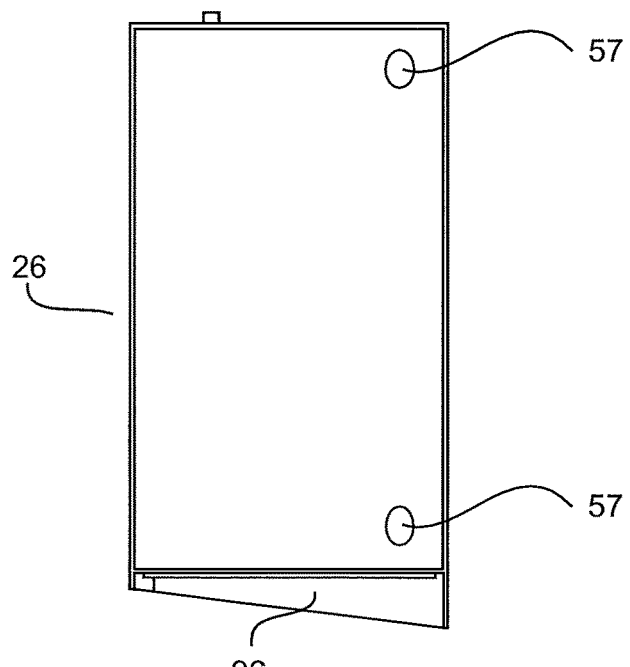
FIG. 19 shows a side view of the inner chamber shown in FIG. 18.

The internal chambers 26 comprise a bottom end 38 and top end 40. The bottom ends 38 are supported on the bottom of the main chamber 18. The top ends 40 are adapted to be received by openings of the top of the tank 14. In this manner, the top ends 40 can be accessed from the top of the tank 14 (see FIG. 1). The bottom ends 38 are adapted to be received by indentations 60 of the bottom of the tank 14 (see FIG. 5). FIGS. 18 and 19 shows a particular arrangement of an inner chamber 26 adapted to be supported within the indentations 60. The bottom end 38 is supported on a wedge 96. The fact that the inner chambers 26 are supported on a wedge 96 allows for the longitudinal axis of the inner chambers to be parallel to the vertical axis of the tank 14. Further, a bottom ring 98 is attached to the bottom end of the inner chamber 26. The bottom ring 98 is adapted to receive gate 39 which allow opening and closing of the bottom end 38 of the inner chamber 26. The upper end 40 of the inner chamber 26 comprises an upper ring 100. The upper ring 100 is adapted to receive a gate 41 allow opening and closing of the upper end 40 of the inner chamber 26

Access to the internal chambers 26 may be provided through the bottom and top ends 38 and 40. For this the bottom end 38 and the top end 40 comprises, respectively, the gates 39 and 41. The gates 39 and 41 are releasable attached to the respective ends of the internal chambers 26. This allows opening and closing of the top and bottom ends of the internal chambers 26 to provide access to the interior of the chambers 26.

Figure 4:
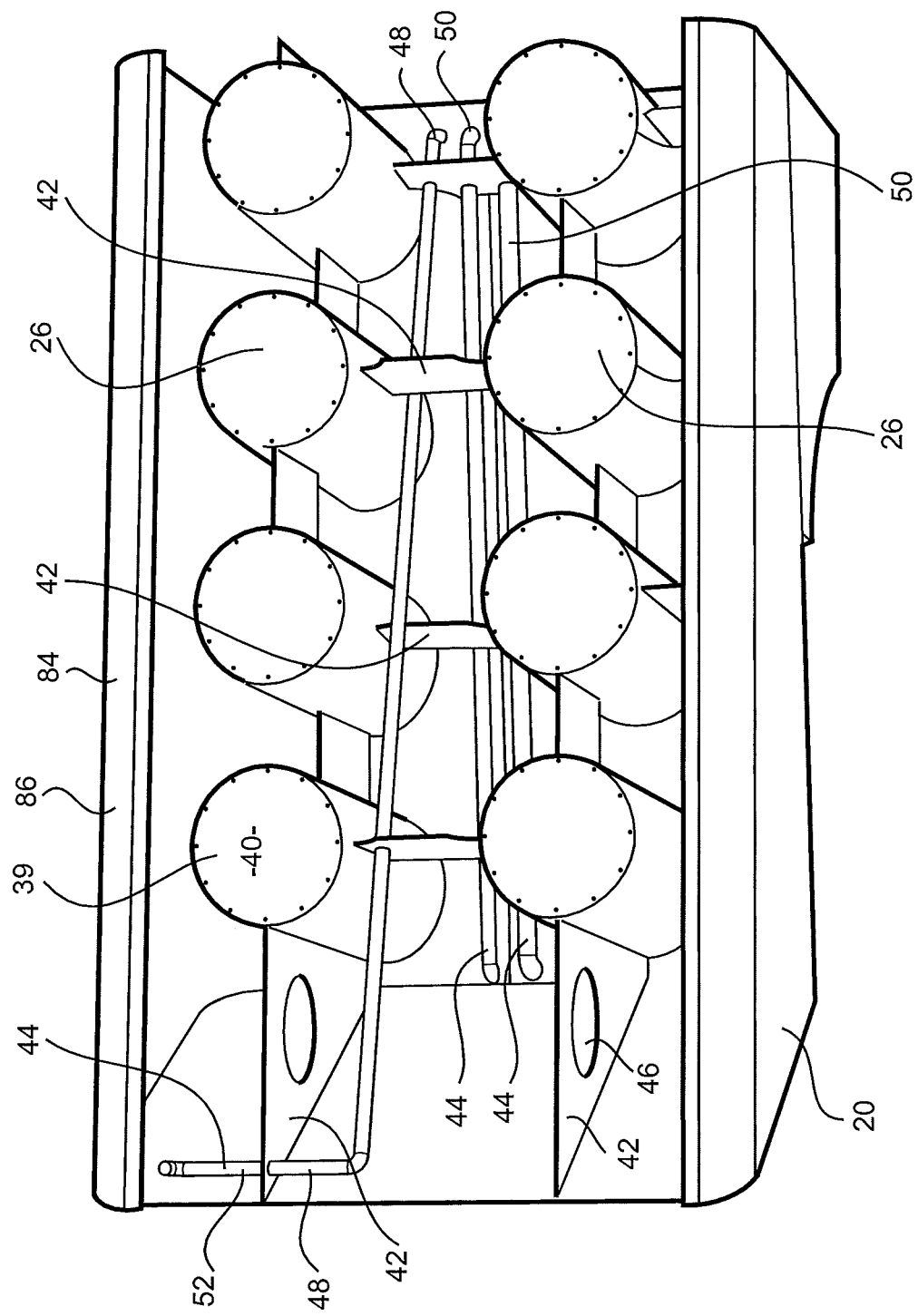
FIG. 4 is a top view of the interior of the tank incorporated in the truck shown in FIG. 1.

In accordance with the present embodiment of the invention, the gate 41 of the top end 40 comprises a plate which is screwed onto the ring 100 of the top end 40 of the internal chamber 26 (see, for example, FIG. 4).

Figure 6:
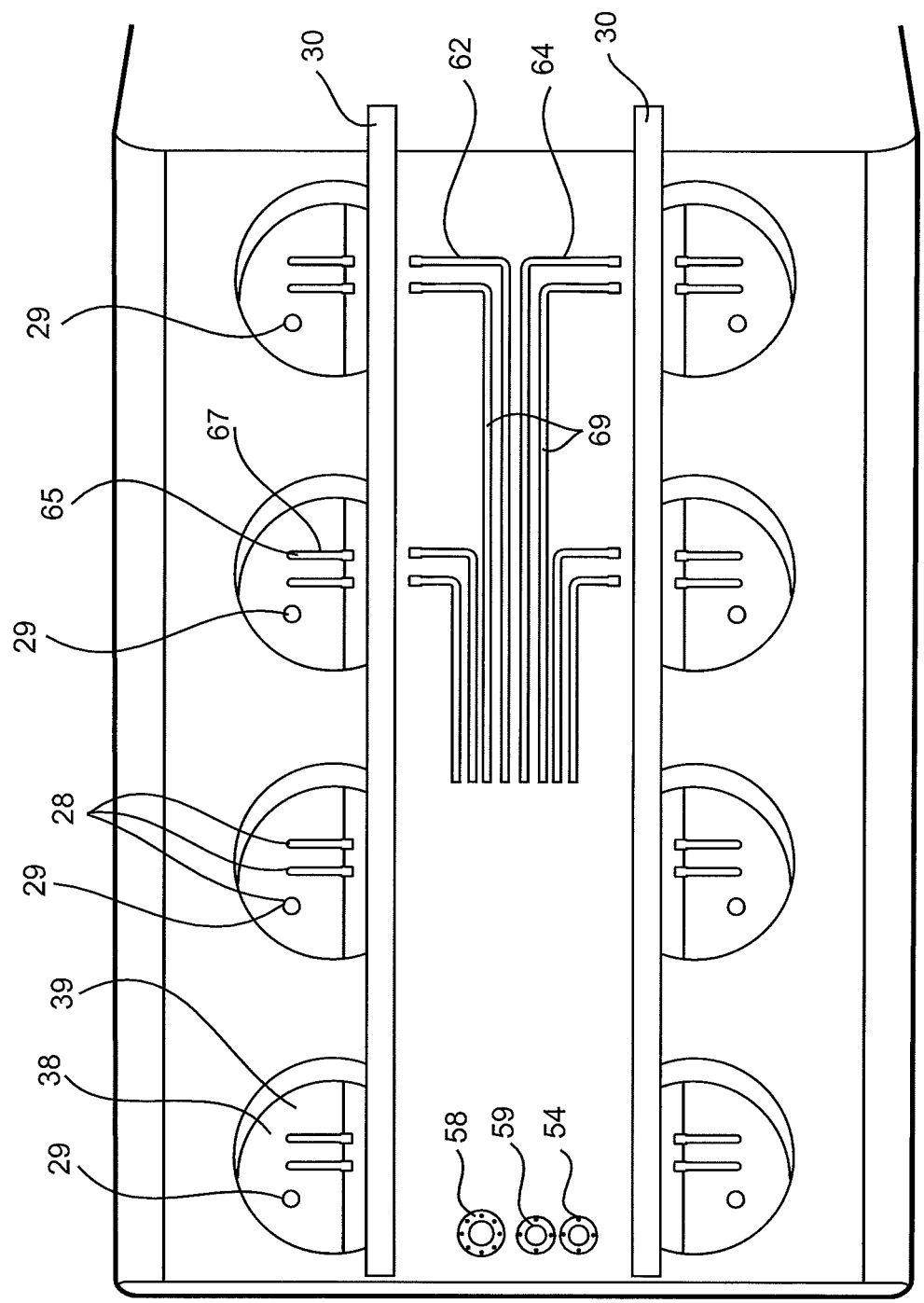
FIG. 6 is a bottom view of a second arrangement of the tank incorporated in the truck shown in FIG. 1.
Figure 7:
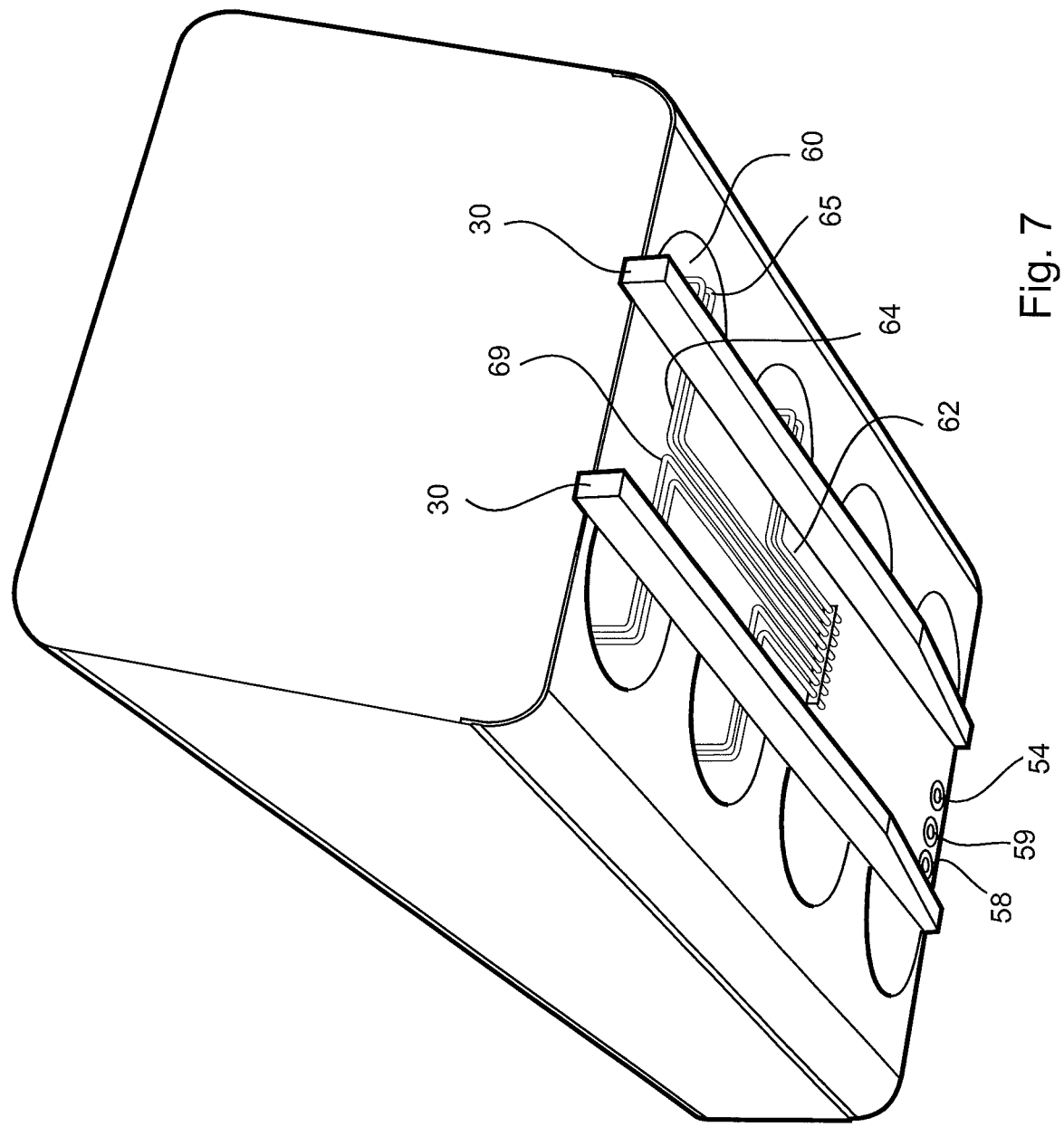
FIG. 7 is a front bottom perspective view of the second arrangement of the tank incorporated in the truck shown in FIG. 1.

Referring to FIG. 6, the gate 39 of the bottom end 38 is screwed onto the ring 98 of the bottom end 38 of the internal chamber 26. In the arrangement shown in FIG. 6, the gate 39 is of semi-circular configuration. Thus, only a portion of the bottom end 38 is releasably closed by the gate. Also, the gate 39 comprises bottom outlet and bottom inlets 28 to allow filling and emptying of the cylindrical chambers 26. An opening 29 is also provided in the plate. The opening 29 is adapted to receive sensing means for measuring the amount of fluid stored in the internal chamber 26.

Further, as shown in FIG. 6, bottom outlets and inlets 28 are fluidly connected to conduits 65. The conduits 65 include ends 67 which extend parallel to the plate. As will be described in greater detail at a later stage, the ends are adapted to be fluidly connected to a fluid source and fluid delivery means for receiving or delivering fluid into or contained within the internal chamber 26.

The tank 14 comprises a pair of longitudinal beams 30 to allow mounting of the tank 14 to the chassis of the truck 10.

Figure 9:
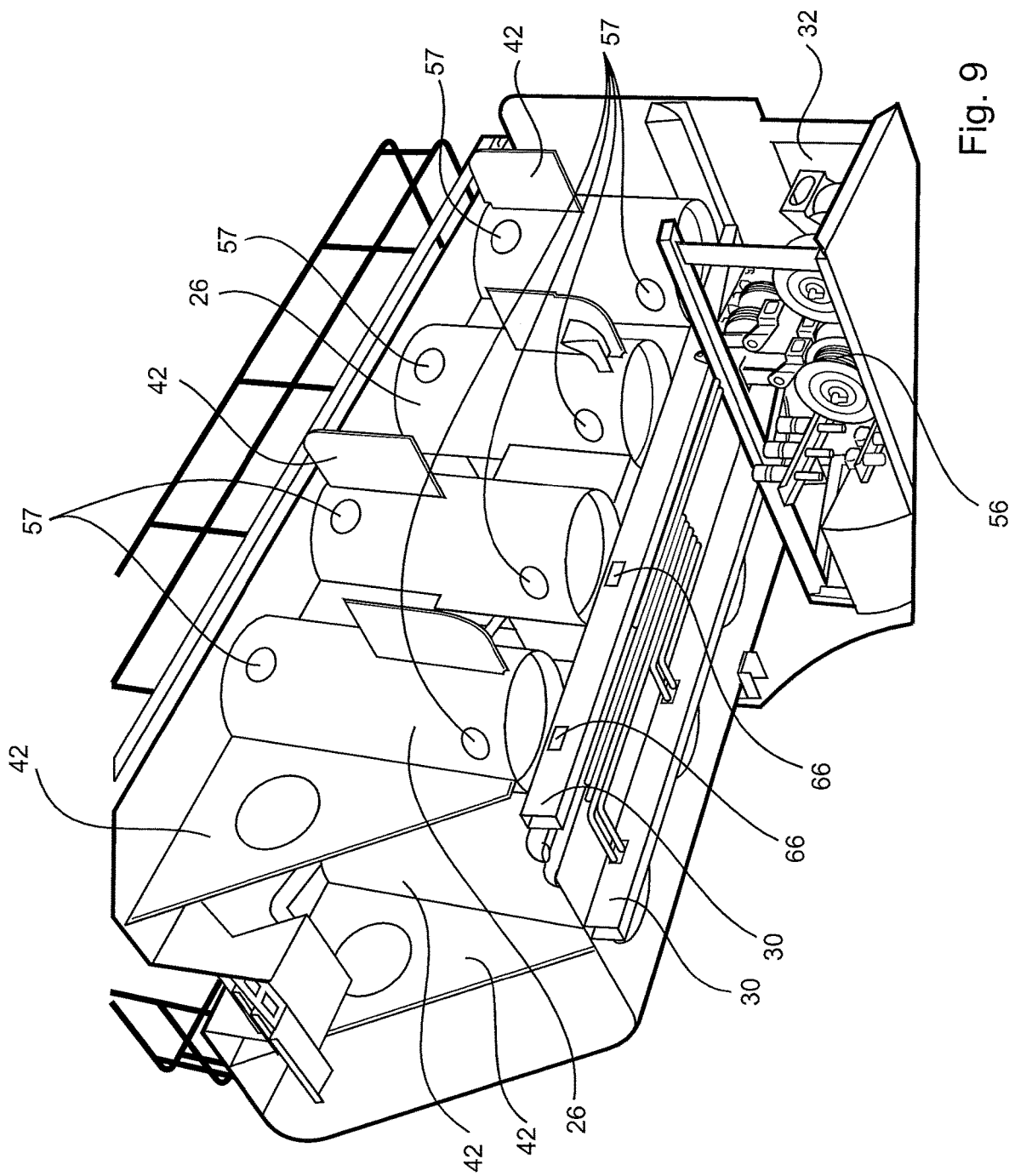
FIG. 9 is cross-section bottom perspective view of a particular arrangement of the tank incorporated in the truck shown in FIG. 1.

Further, the tank 14 comprises a service area 32 (see FIG. 9). The service area 32 is defined by the attachment 20 which is located at the rear bottom end of the tank 14. The service area 32 may be accessed through apertures 34 incorporated in the side walls 36 of the attachment 20.

As mentioned before, the tank 14 comprises a main chamber 18 and a plurality of internal chambers 26 (the cylindrical chambers 26) for storing of a fluid or different type of fluids. In the arrangement shown in FIG. 3, the tank 14 comprises an array of eight cylindrical chambers 26.

Pairs of the cylindrical chambers 26 are arranged longitudinally within the main chamber 18. Each cylindrical chamber 26 is attached via plates 42 to its respective adjacent cylindrical chamber 26. Also, each cylindrical chamber 26 is attached via a plate 42 to the inner surface of the wall of the main chamber 18. This secures the cylindrical chambers 26 within the main chamber 18.

The plates 42 which attach the cylindrical chamber 26 to each other and to the inner surface of the wall are adapted and arranged in such a manner so as to reduce movement of the fluid within the tank as well as facilitating displacement of personnel within the tank 14. In this manner, the plates 42 act as baffles. The plates 42 have a height which is a fraction of the entire length of the cylindrical chamber 26 to which it is attached. This allows for the plates 42 to be attached to the cylindrical chamber 26 at either the upper portion of the cylindrical chamber 26 or the lower portion of the cylindrical chamber 26.

In accordance with the present embodiment of the invention, the plates 42 are arranged at different locations with respect to the height of the plurality of sub-chambers. The plates 42 are alternatively attached to the upper and bottom portion of the cylindrical chambers 26. As shown in FIG. 4, the first and third pair of cylindrical chambers 26 are attached to each other by a plate 42 attached to the upper portion of the cylindrical chambers 26. The second and fourth pair of cylindrical chambers 26 are attached to each other by a plate 42 attached to the lower portion of the cylindrical chambers 26 (see FIG. 9). This arrangement is particular useful for reducing movement of the liquid within the main chamber 18.

Figure 13:
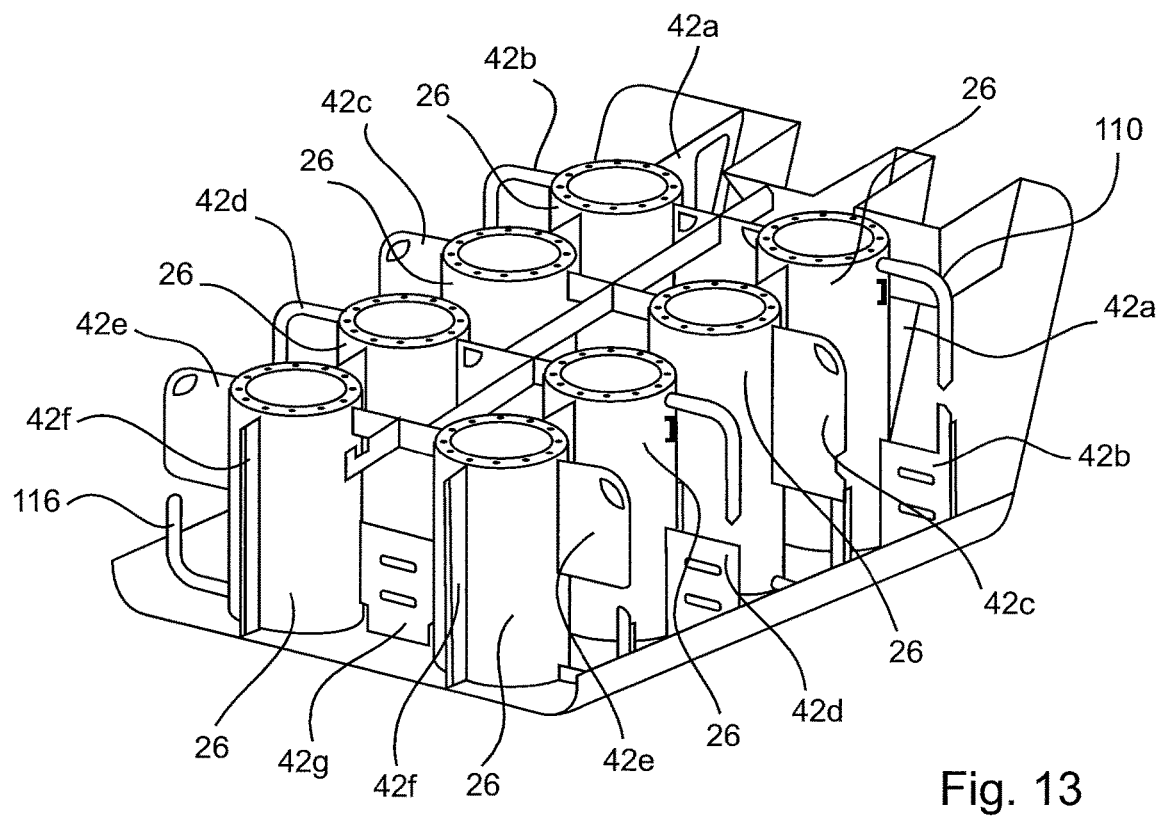
FIG. 13 is a rear perspective view of the interior of the tank showing an alternative baffle arrangement in accordance with an embodiment of the invention.
Figure 14:
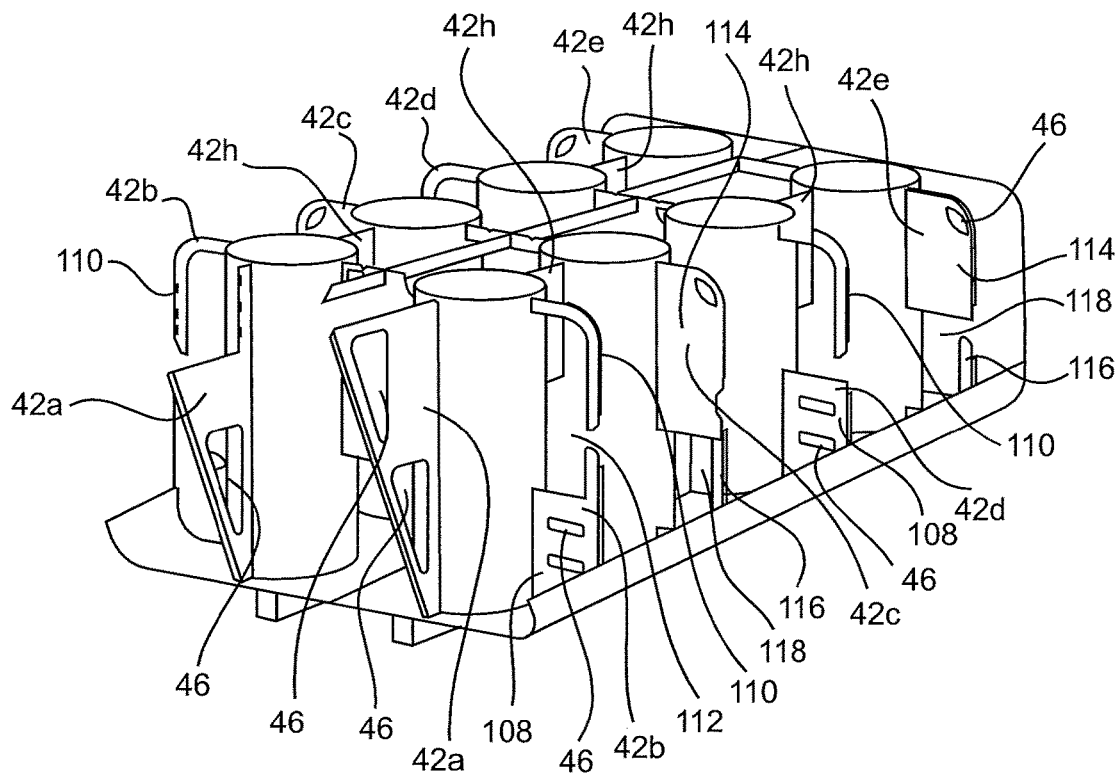
FIG. 14 is a front perspective view of the interior of the tank showing the alternative baffle arrangement shown in FIG. 13.

FIGS. 13 and 14 shows an alternative baffle arrangement with respect to the one shown in FIGS. 3, 4 and 9. As shown in FIGS. 13 and 14, the baffle arrangement comprises baffles 42a to 42h.

The baffles 42a and 42f are located respectively at the front and rear of the tank 14. These baffles 42a and 42f attached the front and rear inner chambers 26 to the front and rear walls of the tank 14. The front baffles 42a include openings 46 which allow passage of fluid as well as of personnel during maintenance processes of the interior of the tank 14.

The baffles 42b to 42e attach the inner chamber 26 to the side walls of the tank 14. There are two different type of baffles 42 which attach the inner chambers 26 to the side walls of the tanks 14. The two different type of baffles 42 are the first type of baffles 42b and 42d and the second type of baffles 42c and 42e Baffles 42b and 42d comprise a lower plate 108 and an upper support bar 110. The lower plate 108 extends between the inner chamber 26 and the side wall of the tank 14. The lower plate 108 comprises openings 46 which allow passage of fluid. The support bar 110 extends from the upper portion of the inner chamber towards the side wall of the tank 14. A portion of the bar 110 extends parallel to the side wall of the tank 14. This arrangement provides a clearance 112 above the lower plate 108 allowing passage of fluids as well of the maintenance personnel.

The baffles 42 c and 42e comprise an upper plate 114 having an opening 46 for allowing passage of fluid. The opening is located at the upper corner adjacent the side wall of the tank 14. A support bar 116 extends along side the side wall of the tank 14 towards the floor of the tank 14 and extents along the floor of the tank 14 towards the inner chamber 26. This arrangement provides a clearance 118 below the upper plate 114 allowing passage of fluids as well of the maintenance personnel.

The first type of baffles 42b, 42d and the second type of baffles 42c and 42e are arranged alternatively within the interior of the tank 14. In this manner, the particular baffle arrangement (shown in FIGS. 13 and 14) comprises plates 108 and 114 which are alternatively attached to the upper and bottom portion of the cylindrical inner chambers 26. The plates 108 are attached at the lower portion of the inner chambers 26. The plates 114 are attached at the upper portion of the inner chambers.

Further, the baffle arrangement shown in FIGS. 13 and 14 also comprises plates 42 which attach the inner chamber 26 to each other. There are a set of plates 42g and 42h. The plates 42g are arranged perpendicularly to the longitudinal axis of the tank 14 and located at the centre of the tank 14. The plates 42h are arranged parallel to the longitudinal axis of the tank 14.

In the particular arrangement shown in FIGS. 13 and 14, the plates 42g are alternatively attached to the upper and bottom portion of the cylindrical inner chambers 26. There are two plates 42h located at each row of inner chambers 26. The front and rear inner chambers 26 are attached to their adjacent inner chamber 26 via the plates 42h. The plates 42h are located at the upper portion of the inner chambers 26.

The plates 42 that attach the cylindrical chambers 26 to the wall of the tank 14 are also alternatively attached to the upper and lower portion of the cylindrical chambers 26. As shown in FIG. 4, the first and third pair of cylindrical chambers 26 are attached to the tank 14 wall by a plate 42 attached to the lower portion of the cylindrical chambers 26. The second pair and fourth pair of cylindrical chambers 26 are attached to the tank 14 wall by the plate 42 attached on the upper portion of the cylindrical chambers 26. The front pair of cylindrical chambers 26 are attached via a pair of front plates 42 that extend from the outer circumference of the cylindrical chamber 26 to the front wall of the tank 14. The front plates 42 comprise an opening 46 to facilitate displacement of personnel within the main chamber 18 of the tank 14. The front plates 42 reduce movement of liquid from one side of the tank 14 to the other side of the tank 14. The rear pair of cylindrical chambers 26 are attached to the rear wall of the tank 14 via rear plates 42. The plates 42 secure the cylindrical chambers 26 within the main chamber 18.

Inner plumbing 44 is incorporated in the tank 14 to feed the main chamber 18 of the tank 14 with fluid to be stored in the main chamber 18. The inner plumbing 44 comprises a plurality of conduits 48, 49 and 50 extending longitudinally within the main chamber 18. A first conduit 48 is adapted to provide fluid to the top end of the tank 14. A pair of second conduits 49 and 50 is adapted to allow filling or emptying of the tank 14.

The first conduit 48 extends diagonally within the main chamber 18. In this manner a first end of the conduit 48 is attached to the bottom of the tank 14 and a second end (opposite to the first end) is located at an upper portion of the tank 14. As shown in FIG. 4, the conduit 48 comprises a section 52 extending perpendicularly from the main section of the conduit 48. In this manner, the second end is located at the upper front end corner of the tank 14. The extension 52 is adapted to be attached to fluid delivery means mounted on the top of the tank. The fluid delivery means may comprise a water cannon.

The first end of the conduit 48 is fluidly connected to an inlet 54 located at the rear bottom end of the tank 14 (see FIG. 6). This allows delivering the fluid to the fluid delivery means. In an arrangement, the inlet 54 is fluidly connected to the main chamber 18. This allows feeding the fluid delivery means with fluid contained in the main chamber 18.

The pair of second conduits 49 and 50 extends horizontally along the bottom surface of the main chamber 18. First ends of the conduits 49 and 50 are fluidly connected to inlets/outlets 58 and 59 located at the rear bottom end of the tank 14. Second ends of the conduits 49 and 50 are located at the front centre region of the tank 14. The second ends the conduits 49 and 50 are adapted to receive/deliver the fluid contained in the tank 14 for delivery to the inlet/outlets 58 and 59. This allows emptying or filling of the main chamber 18 of the tank 14. For this, the outlets 58 and 59 are fluidly connected to hoses 56 to allow delivery of the fluid. The hose 56 are included in the service area 32.

Figure 5:
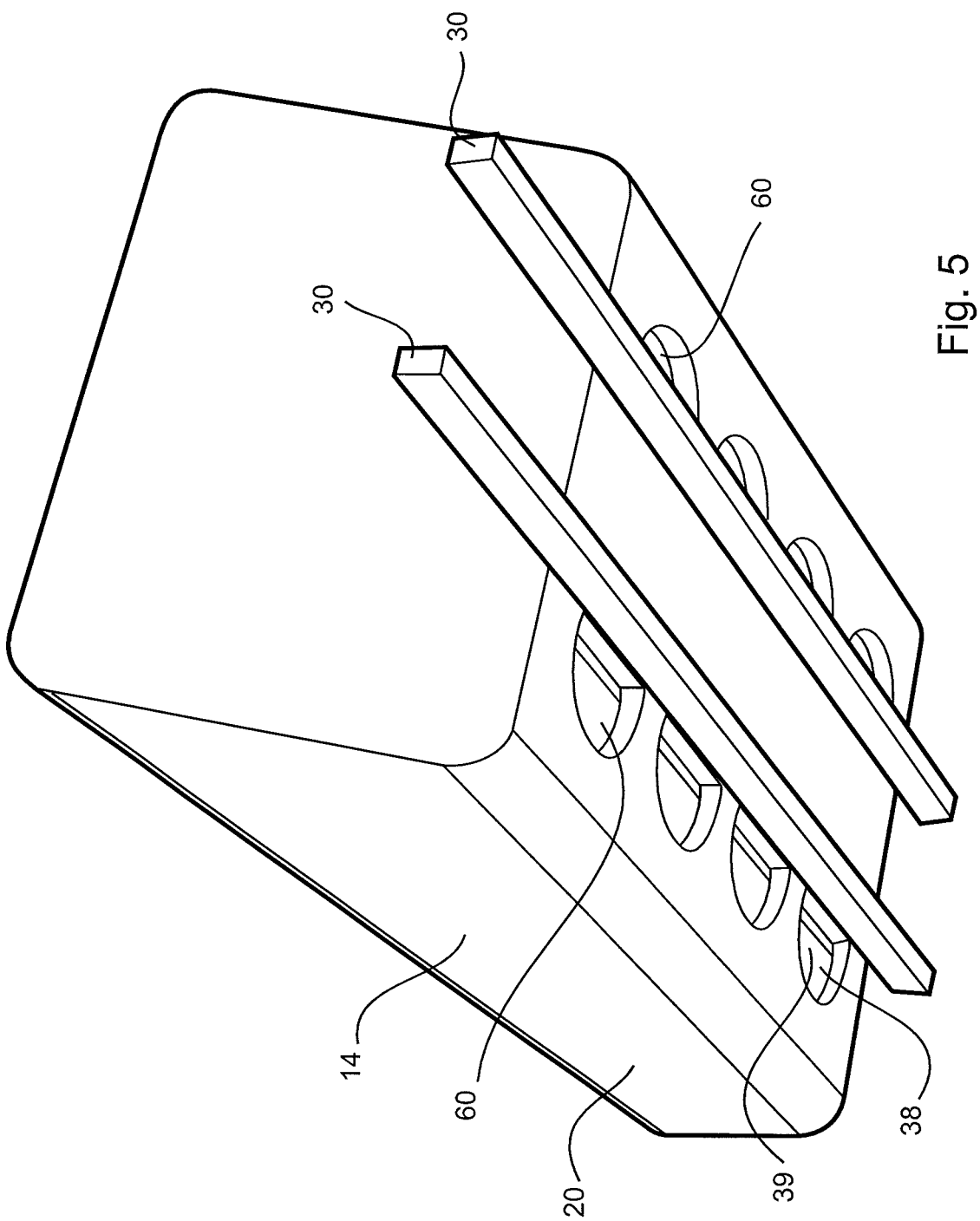
FIG. 5 is a bottom perspective view of a first arrangement of the tank incorporated in the truck shown in FIG. 1.

FIG. 5 shows the bottom of the first arrangement of the tank 14. The bottom comprises an array of circular indentations 60. The array of circular indentations 60 is configured in the same manner as the array of cylindrical chambers 26 included in the tank 14. In this manner, each of the bottom ends 38 of the cylindrical chambers 26 may be located above one of the circular indentations 60. This allows access to the bottom ends 60 of the cylindrical chambers 26 from the exterior of the tank 14.

The cylindrical chambers 26 are adapted to be filled with fluid. In a first arrangement, the cylindrical chamber 26 may be filled with the fluid included in the main chamber 18. In this first arrangement, the cylindrical chambers 26 comprise ports 57 to allow entrance of the fluid as the main chamber 18 is being filled with the fluid.

In a second arrangement, the cylindrical chambers 26 may be filled with fluid which is not contained in the main chamber 18. In this second arrangement, the bottom ends 38 of the cylindrical chambers 26 include the plurality of inlet and outlets 28. The fluid is delivered into the cylindrical chamber 26 through exterior plumbing 62 located at the bottom portion of the tank 14 (see, for example, FIGS. 6 and 7). The exterior plumbing 62 comprises a plurality of conduits 64 fluidly connected to the inlets and outlets 28 of the bottom end 38 of the cylindrical chambers 26.

As mentioned before, there are two arrangements of the tank 14 in accordance with the present embodiment of the invention. In a first arrangement, the main chamber 18 and the cylindrical chambers 26 are fluidly connected through ports 57 incorporated in the side walls of the cylindrical chamber 26. Thus, the cylindrical chambers 26 are filled during the filling process of the main chamber 18 with the fluid of the main chamber 18. Alternatively, the tank 14 may be filled by opening the gates 41 of the internal chambers 26 and delivering through the top ends 40 of the internal chambers 26 the fluid. This allows filling of the internal chambers 26 simultaneously with the main chamber 18. The main chamber 18 is filled as the fluid enters the internal chambers 26 because, as mentioned before, the internal chamber 26 comprise ports 57 which fluidly connect the interior of the internal chambers 26 with the main chamber 18.

In the second arrangement, the main chamber 18 is not fluidly connected to the cylindrical chambers 26. In this second arrangement, the cylindrical chambers 26 and the main chamber 18 are filled with different fluids. This arrangement allows filing the main chamber 18 with a fluid different than the fluid or fluids with which the cylindrical chambers 26 are being filled.

FIG. 5 shows the first arrangement of the tank 14 in accordance with the present embodiment of the invention. As mentioned before, in the first arrangement of the tank 14, the cylindrical chambers 26 are fluidly connected to the main chamber 18. Each of the cylindrical chambers 26 comprises at least one port to allow entrance into each cylindrical chamber 26 of the fluid with which the main chamber 18 is being filled with. The ports 57 provide the fluid communication between the main chamber 18 and the interior of each of the cylindrical chambers 26. The first arrangement is particularly advantageous for storing and transporting a single fluid. For example, the first arrangement of the tank 14 may be used as a water tank 14. In this arrangement, the service area 32 may be omitted. Instead, a bar 90 comprising at least one water sprayer 92 may be attached to the rear end of the tank 14. The water sprayers are fluidly connected to the main chamber 18. This allows delivery of the fluid contained in the main chamber 18 to the water sprayers for, for example, spraying onto the ground to reduce the presence of dust in the air. FIG. 15, shows a water tank 14 in accordance with a particular arrangement of the present embodiment of the invention.

In the second arrangement of the tank 14, the main chamber 18 is filled with fluid separately from the cylindrical chambers 26. The main chamber 18 is filled with the exterior plumbing 62 included in the main chamber 18. The fluid to be stored in the cylindrical chambers 26 is fed into each of the cylindrical chambers 26 via the exterior plumbing 62 located at the bottom of the tank 14 (see, for example, FIG. 6). The inner chambers 26 may be also be filled with fluid through the top ends 40 of the internal chambers.

As mentioned above, the second arrangement allows filling the main chamber 18 separately from the cylindrical chambers 26. This allows filling the main chamber 18 with a fluid different than the fluid with which the cylindrical chambers 26 are to be filled. Similarly, the cylindrical chambers 26 may be filled separately with respect to each other. In this manner, the cylindrical chambers 26 may be filled with different fluids.

The fact that the cylindrical chambers 26 may be filled with different fluids with respect to each other is particularly advantageous. For example, the main chamber 18 may be filled with fuel and the cylindrical chambers 26 may be filled with different type of fluids such as engine oils or hydraulic fluids. In this manner, the tank 14 in accordance with the second arrangement may be incorporated in service trucks 10 for providing fuel and the different type of fluids to, for example, vehicles.

As mentioned before, the cylindrical chambers 26 may be filled by opening the gates 41 for delivery of the fluid through the top ends 40 of the internal chambers. Alternatively, filling of the cylindrical chambers 26 is conducted through exterior plumbing 62 located at the bottom of the tank 14. As shown in FIG. 6, the exterior plumbing 62 extends from the rear portion of the tank 14 to each of the cylindrical chambers 26. The exterior plumbing 62 is located between the support beams 30 of the tank 14 and is centred at the bottom of the tank 14. The exterior plumbing 62 comprises a manifold 69 comprising a plurality of conduits 64. The conduits 64 for a respective cylindrical chamber 26 are fluidly connected to the bottom inlet and outlets 28 of the respective cylindrical chamber 26.

The conduits 64 extend longitudinally from the rear of the tank 14 to the respective cylindrical chamber 26. In particular, for each cylindrical chamber 26 there are three conduits 64 which extend between the support beams 30 and divert perpendicularly towards the bottom end 38 of the respective cylindrical chamber 26 (see FIG. 6). For this, the beams 30 include openings 66 allowing the conduits 64 to traverse the beams 30 and extend into the respective indentation 60 to be connected to the inlets and outlets 28 of the cylindrical chamber 26 to which the conduits 64 are fluidly attached.

Figure 10:
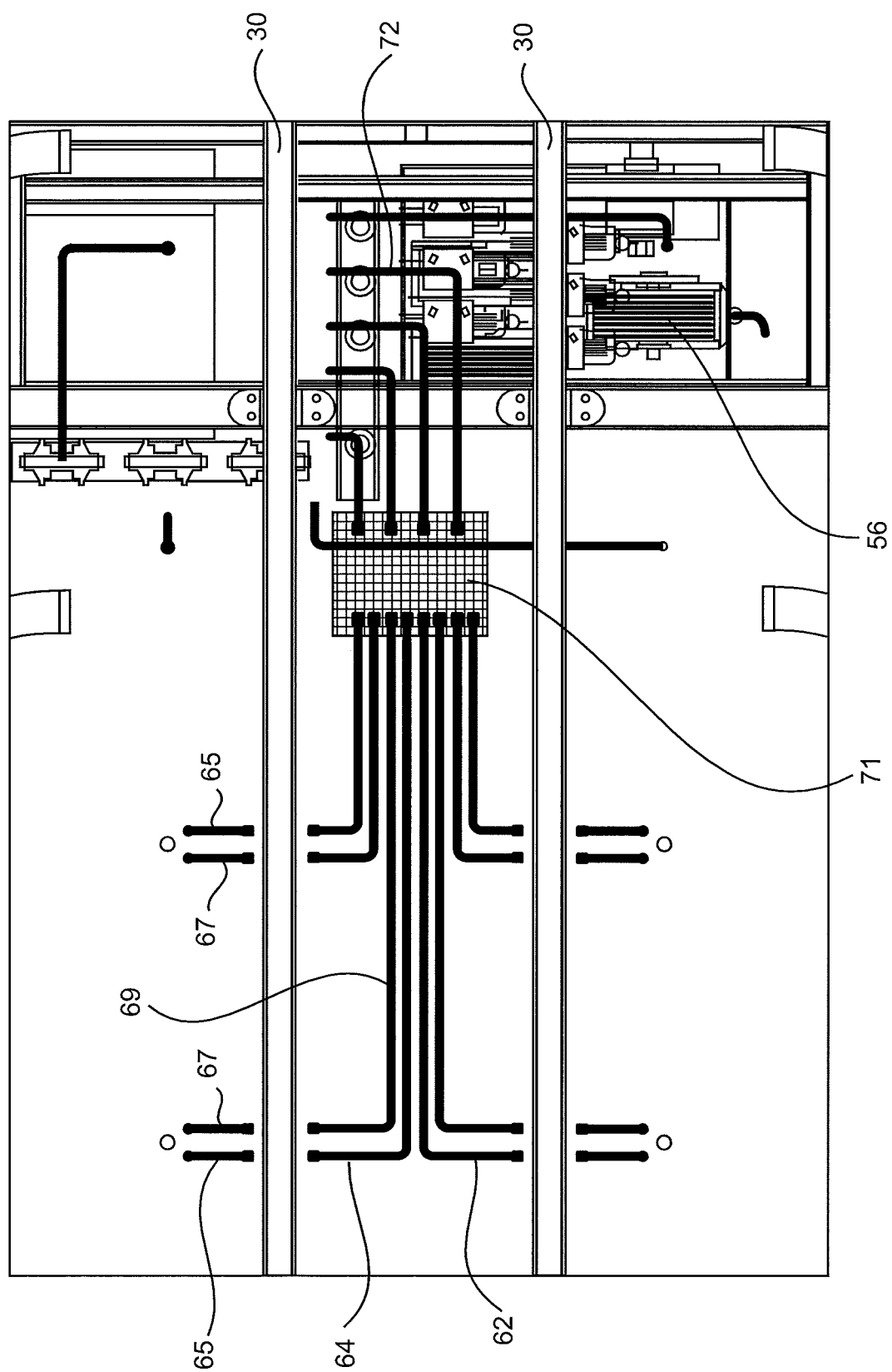
FIG. 10 is a bottom view of the attachment shown in FIG. 9 incorporating the service area 32.

We refer now to FIGS. 9 and 10. It should be noted that the FIGS. 9 and 10 are schematic only. In the particular arrangement shown in FIGS. 9 and 10 the conduits 64 are fluidly connected to four internal chambers 26. However, other arrangement in accordance with the present invention may include conduits 62 and 64 which are fluidly connected to all of the internal chambers.

As shown in FIGS. 9 and 10, the conduits 62 and 64 extend up to the inner side of the beams 30. At the outer side of the beams, opposite to the conduits 62 and 64 are conduits 65. In this arrangement, the conduits 65 are fluidly connected to the internal chambers 26 and to the conduits 64 and 62 of the manifold 69. One end of the conduits 65 is fluidly connected to the internal chamber 26 and other end of the conduits 65 is fluidly connected to the conduits 64 and 62. In FIGS. 9 and 10 the connection between conduits 64 and 62 with the tubes 67. The tubes 67 traverse the beam 30 through openings 66 of the beams 30.

The manifold 69 may be a prefabricated manifold adapted to be attached to the bottom end of the tank between the beams 30. As will be described with reference to the method for assembling the second arrangement of the tank 14, the fact that the manifold 69 is prefabricated facilitates assembly of the second arrangement of the tank 14.

The conduits 64 allow filling and emptying the cylindrical chambers 26 with fluid. As mentioned before, the conduits 64 are fluidly connected to hoses 56 which are located in the service area 32. The connection between the hoses 56 and the conduits 62 and 64 is conducted via a distribution system 71. The distribution system 71 is fluidly connected to the conduits 64 via tubes 67 and the distribution system 71 is connected to the hoses 56 via conduits 73. The distribution system 71 is adapted to distribute the fluid from the internal chambers 67 to the hoses 56 and vice versa.

In accordance to the present embodiment of the invention, the tubes 67 which fluidly connect the conduits 62 and 64 with the conduits 65 as well as the conduits 62 and 64 with the distribution system 71 are all of the same length. In order for the tubes 67 to be all of the same length the dimensions of the manifold (including the conduits 62 and 64) and of the conduits 73 are configured such that after installing the manifold 69 and the conduits 73 in conjunction with the distribution system 71 fluidly connecting these elements (conduits 62 and 64, distribution system 71 and conduits 73) is done via tubes 67 that have all the same length. In a particular arrangement of the present embodiment of the invention, the tubes have a length of 400 mm.

In alternative arrangements of the present embodiment of the invention, the distribution system 71 may be omitted. Instead there are an additional four conduits 73 which in conjunction with the conduits 73 shown in FIG. 10 define a set of 8 conduits 73 which are fluidly connected to the hoses 56 of the service area. In this particular arrangement, each of the eight conduits 73 is fluidly connected to one of the conduits 62 and 64 via the tubes 67. As mentioned, before, the conduits 62, 64 and 73 are configured such that the tubes 67 which connect the conduits 62 and 64 with the conduits 73 are all of the same size. In a particular arrangement of the present embodiment of the invention, the tubes have a length of 400 mm.

The fact that the tubes 67 are all of the same length is particularly advantageous. This is because the size of the tubes for fluidly connecting the conduits 62, 64 and 73 is standarised. Thus, during maintenance and repair the personnel only need to have tubes that have the same size. This facilities the maintenance and repair procedure in view that it not necessary to have a plurality of tubes of different length and no time is wasted by deciding which tube of specific length is appropriate for fluidly connecting the any of the conduits 62, 64 and 73 and the distribution system 71 with respect to each other.

Figure 11:
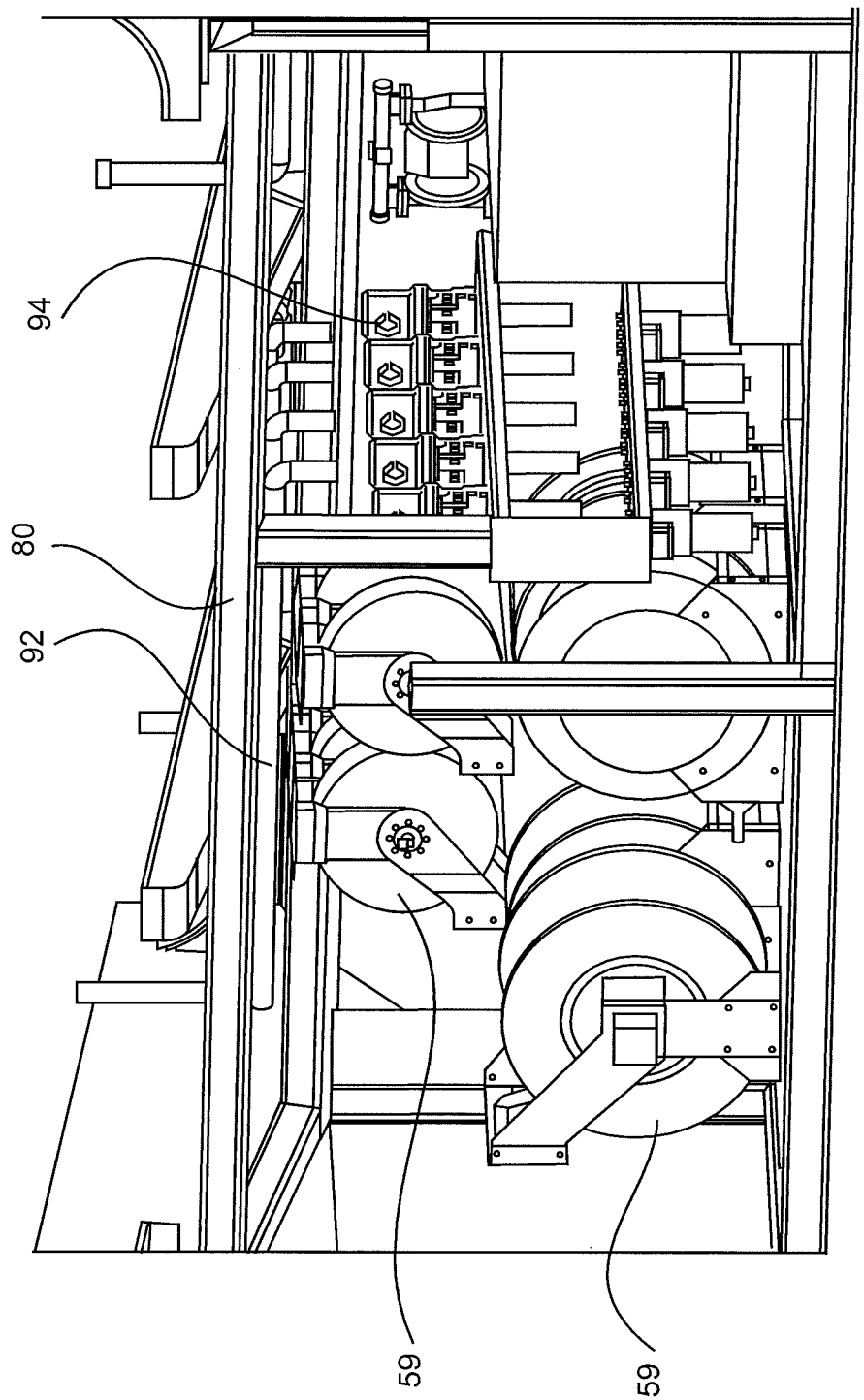
FIG. 11 is a side view of the attachment shown in FIG. 9 incorporating the service area 32.

The service area 32 comprises a plurality of reels 59 incorporating the hoses 56 (see FIG. 11). The hoses 56 are adapted to be fluidly connected to the conduits 64 to allow filling of the cylindrical chambers 26 of the tank 14 as well as to deliver the fluid stored in the tank 14. Conduits 92 allow fluidly communicating the hoses 56 with the cylindrical chambers 26. Filtering means 94 may be provided for filtering of the fluid stored in the tank 14. The service area 32 comprises apertures 34 which allow access to the interior of the service area 32. Reels 59 for storing the hoses 56 are arranged such that hoses 56 can be accessed from the apertures 34. The service area 32 may also include control panels 94 for controlling and monitoring the filing and emptying of the tank 14 and the inner chambers 26 as well as the delivery of the fluids via the hoses 56. (see FIG. 16.

Figure 12:
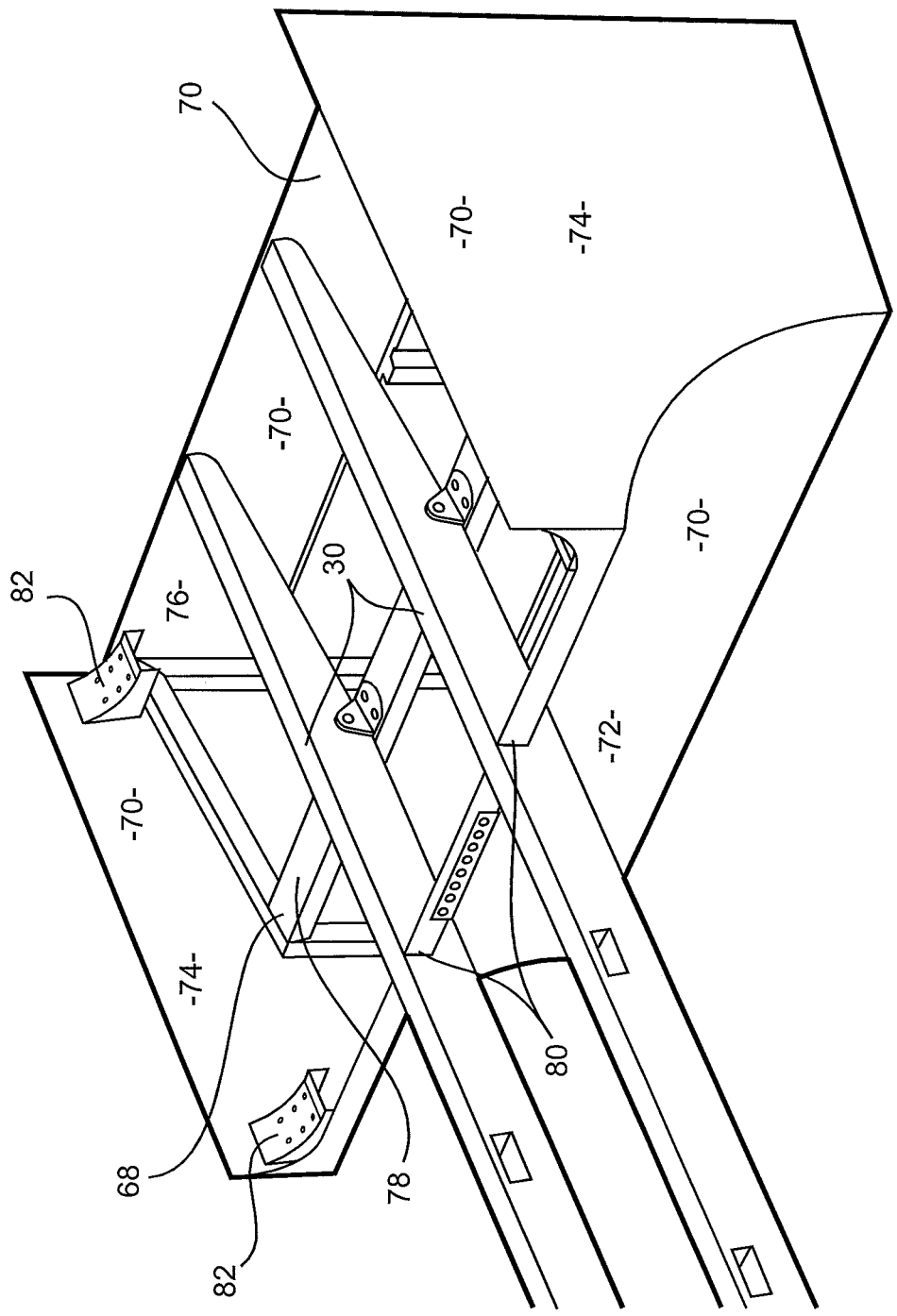
FIG. 12 is a perspective view of the attachment of the tank incorporated in the truck shown in FIG. 1.

Referring now to FIG. 12, the service area 32 is incorporated in an attachment 20 adapted to be attached to the bottom rear end of the tank 14. The attachment 20 comprises a frame 68 covered by sheets 70 defining the service area 32. The sheets 70 enclose the frame 68 so as to define the service area 32. There are a front sheet 72, two side sheets 74 and a rear sheet 76. The side sheets 74 and the rear sheet 76 include apertures to provide access to the interior of the service area 32. The apertures may include doors to seal the interior of the attachment 20. The front sheet 72 has a curved configuration in order to be able to be attached to the rear bottom end of the tank 14 to avoid interference with the wheels 16 during movement of the truck 10 incorporating the tank 14.

Figure 17:
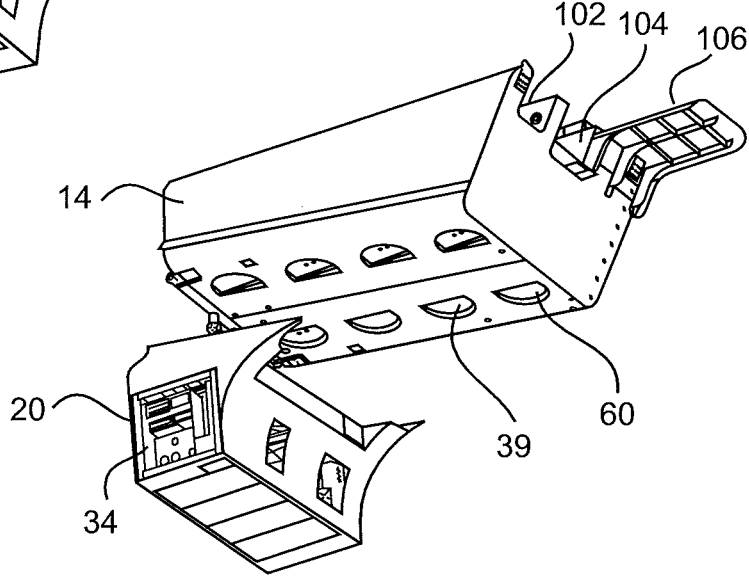
FIG. 17 shows the process of attaching the service area to the bottom of the tank in accordance with an embodiment of the invention.

The attachment 20 is adapted to be attached to the rear bottom of the tank 14 shown in FIG. 13. For this, as shown in FIG. 12, the frame 68 of the attachment 20 includes an upper beam 78 to which the longitudinal beams 30 (attached to the bottom of the tank 14, see FIG. 5) are attached. The front sheet 78 of the space includes indentations 80 adapted to receive the longitudinal beams 30. Curved pads 82 are provided on each upper corners of the attachment 20 adapted to contact the bottom round edges of the tank 14 during fastening of the attachment 20 to the rear bottom end of the tank 14. In accordance with the present embodiment of the invention, the attachment 20 is prefabricated attachment which may be attached to the bottom end of the tank 14 during manufacture of the second arrangement of the tank 14. FIG. 17 shows the process of attaching the attachment 20 to the bottom of the tank 14. As will be described with reference to the method for assembling the second arrangement of the tank 14, the fact that the attachment 20 is prefabricated facilitates assembling of the second arrangement of the tank 14.

An embodiment of the invention also includes a method for assembling the tank 14 in accordance with the first and second arrangements of the tank 14.

The method for manufacturing the first and second arrangement of the tank 14 initiates by providing a structure 84 of the tank 14 as shown in FIG. 4. The tank structure 84 comprises a housing 86 defining the main chamber 18. The plurality of cylindrical chambers 26 are incorporated within the housing 86 of the tank structure 84 as has been previously described. The tank structure 84 comprises the longitudinal support beams 30 to allow attachment of the tank 14 to the chassis of the truck 10.

It is particularly advantageous to manufacture the tank structure 84 as described in the previous paragraphs. This is because the same type of tank structure 84 may be used for manufacturing any of the arrangements of the tank 14 in accordance with the present embodiment of the invention.

In order to manufacture the first arrangement of the tank 14 the cylindrical chambers 26 need to be adapted to allow entrance of fluid within the cylindrical chamber 26. This is accomplished by, for example, cutting ports 57 into the side walls of the cylindrical chambers 26 (see FIG. 9). The ports 57 allow fluid to enter the cylindrical chambers 26 as the main chamber 18 is filled with fluid. After cutting the ports 57 into the side wall, the tank 14 is sealed by locating the top on the tank 14.

At this stage, the service attachment 20 may be attached to the rear bottom end of the tank 14. The attachment 20 includes the reels 59 for holding hoses 56 that are fluidly connected to the interior of the tank 14. The fluid connection is accomplished by connecting the hoses 56 to the inlets/outlets 58 and 59 of the main chamber 18 of the tank 14. The hoses 56 allow filling and extraction of the fluid within the main chamber 18 and the cylindrical chamber 26 of the tank 14.

Alternatively, as mentioned before, a bar 90 incorporating at least one water sprayer 92 may be attached to the rear end of the tank 14. In this particular arrangement, the inlets/outlets 58 and 59 are fluidly connected to the bar incorporating the water sprayers.

For manufacturing the second arrangement of the tank 14, no ports 57 are cut into the side walls of the cylindrical chambers 26. Instead, inlets and outlets 28 are cut into the bottom ends 38 of the cylindrical chambers 26. After the outlets and inlets 28 have been cut, the external plumbing 62 is connected to the bottom of the tank 14 and fluidly connected to the cylindrical chambers 26 through the outlets and inlets 28. As mentioned before, the external plumbing 62 includes a pre-fabricated manifold 69 which is attached between the beams 30 at the bottom of the tank 14. The fact that the manifold is a pre-fabricated manifold is particularly advantageous because it facilitates and reduces the time required for connecting the external plumbing 62 in contrast if each of the conduits 64 needs to be attached separately to the bottom end of the tank 14.

At this stage, the attachment 20 providing the service area 32 is attached to the tank 14 and the external plumbing 62 is fluidly connected to the hoses 56 within the service area 32 (see FIG. 17). This allows extraction of the fluid from the cylindrical chambers 26 or filling of the cylindrical chambers 26 through the hoses 56. Also, the openings 54, 58 and 59 of the main chamber 18 are fluidly connected to the respective hoses 56 within the service attachment 20 to allow emptying or filling of the main chamber 18. The tank 14 may then be sealed by attaching the top on the upper portion of the tank 14.

Referring to FIG. 10, the manifold 69 is fluidly connected to conduits 92 of the service area 32. In this manner the fluid can be delivered to the internal chambers 26 as well as received from the internal chambers 26.

After manufacture of either the first or the second arrangement of the tank 14, the tank 14 is mounted to the chassis of the truck 10. Additional features such as a barrier 24 surrounding the top of the tank 14 may be added at this stage.

It is evident that the present embodiment of the invention provides an efficient and useful method for assembling the first and second arrangement of the tank 14. The fact that the tank structure 84 comprises at least one internal chamber 26 (the cylindrical chambers 26) within the main chamber 18 of the tank 14 is particularly advantageous because it allows using the tank structure 84 for either the first or the second arrangement.

Another advantage of the present embodiment of the invention is that the inclusion of at least one internal chamber 26 inside the main chamber 18 reduces the movement of the fluid located within the main chamber 18 during transportation of the fluid. This is because the internal chambers 26 acts as obstacles to the movement of the fluid located within the main chamber 28 as the truck is moving.

This is particularly true because, in accordance with the present embodiment of the invention, the internal chambers 26 are located in their entirety within the main chamber 18 of the tank 24.

Further advantages are the facts that access to the internal chambers 26 as well as to the external plumbing 62 is provided through the bottom of the tank 14. In this manner the tank 14 and the external conduits 62 (in view that the conduits 62 are not concealed within the tank 14) can be serviced from the bottom of the tank. Thus, there is no need to access the top of the tank 14. Thus, reducing the risks of injury during servicing of the tank 14.

As mentioned before, in accordance with the present embodiment of the invention, the internal chambers 26 are of cylindrical configuration. To provide the internal chamber 26 with a cylindrical configuration is particularly advantageous. This is because the cylindrical configuration provides greater strength to the internal chambers. Also, the fact that internal chambers 26 are of cylindrical configuration reduces the risk of cross-contamination of the fluids located within the internal chambers 26 and the main chamber 18. This is because cylinders do not include corners (as is the case in polygonal shapes) which may be easily ruptured.

Further, the fact the internal chambers 26 are of cylindrical configuration facilitates determining the amount of fluid contained in the internal chambers 26. In fact, it appears that a single sensing mean is sufficient to measure the amount of fluid occupying a cylindrical chamber.

Moreover, it is particularly easy for personnel to move within the main chamber 18. This is because, the interior of the main chamber 18 incorporating the at least one internal chamber 26 is arranged and fastened within the main chamber 18 in such a manner that personnel can walk within the main chamber 18 with relatively easiness.

Also, as mentioned before, the cylindrical chambers have top and bottom ends which may be opened simultaneously. This arrangement is particularly advantageous because it allows accessing the interior of the internal chambers 26 from its top end and/or bottom end. Accessing the interior of the internal chamber 26 from the top end is advantageous because it allows filling the internal chambers 26 from the top of tank 14. The fact that the top and bottom ends of the internal chambers 26 may be opened simultaneously facilitates cleaning of the internal chambers 26 because it allows hosing the interior of the internal chambers 26 from the top of the tank towards the bottom end of the internal chamber. The cylindrical configuration of the internal chambers 26 also facilitates scrubbing of the interior of the internal chamber 26 because no corners are provided within the internal chambers 26.

Modifications and variations as would be apparent to a skilled addressee are deemed to be within the scope of the present invention.

Further, it should be appreciated that the scope of the invention is not limited to the scope of the embodiments disclosed. For example, in a particular arrangement of the second arrangement of the tank 14, one or at least some of the cylindrical chambers may include ports 57 to allow to be filled with the fluid included in the main chamber 18. This arrangement is particularly useful because it allows providing tanks 14 with main chambers having different volumes for storing the fluid. On occasions, it is desired that the main chamber 18 of a tank 14 stores an amount of fluid greater than the amount of fluid that can be stored in the second arrangement of the tank 14. To increase the volume of the main chamber 18, ports 57 are cut into specific cylindrical chambers 26 (see FIG. 9). As mentioned before, the ports 57 allow fluid of the main chamber 18 to enter the cylindrical chambers 26. Thus, the cylindrical chambers 26 in which ports 57 have been cut provide an additional storage place for the fluid that is to be stored in the main chamber. In this manner the main chamber 18 of the second arrangement of the tank 14 can be increased.

Also, the scope of the invention is not limited to the handling of fluids. Other type of materials could be stored in the main chamber 18 and the internal chambers 26. Moreover, the invention is not limited to tanks adapted to be mounted on trucks. The present invention may be applied to any type container for handling any type of materials.

Throughout the specification and claims, unless the context requires otherwise, the word "comprise" or variations such as "comprises" or "comprising", will be understood to imply the inclusion of a stated integer or group of integers but not the exclusion of any other integer or group of integers.

Throughout this specification, unless the context requires otherwise, the word "comprise" or variations such as "comprises" or "comprising", will be understood to imply the inclusion of a stated integer or group of integers but not the exclusion of any other integer or group of integers.

The invention claimed is:

1. A tank for mounting on a load carrying platform of a service truck to transport a first fluid in a main chamber and at least one second fluid in at least one sub-chamber permitting storing the second fluid separate from the first fluid, the main chamber and the at least one sub-chamber being fluidly connected to piping of the service truck for either filling the main chamber with the first fluid and the at least one sub-chamber with the second fluid or delivering the first fluid and the second fluid to delivery means for delivering the first fluid and the second fluid outside the main chamber and the at least one sub-chamber to locations distal to the service truck, the tank comprising:

the main chamber having an exterior surface defining an inner volume adapted to receive the first fluid, and the at least one sub-chamber having first and second ends and a side wall having an exterior surface located within the inner volume of the main chamber, and an inner surface defining an inner volume within the at least one sub-chamber to store the second fluid, the side wall of the at least one sub-chamber having at least one first location comprising a first gate, the first gate being adapted to be selectively displaced between a closed condition to keep the second fluid separate from the first fluid and an open condition to allow flow of the first fluid into the inner volume of the at least one sub-chamber;

each end comprising a second location comprising a second gate adapted to be selectively displaced between an open condition and a closed condition to allow flow of the second fluid into the inner volume of the at least one sub-chamber, and wherein the at least one sub-chamber is arranged with respect to the main chamber such that the first location comprising the first gate is located within the main chamber and the second location comprising the second gate is located exterior to the main chamber and the side wall of the at least one sub-chamber is located within the inner volume of the main chamber in order for the exterior surface of the side wall of the at least one sub-chamber to be surrounded by the first fluid.

2. The tank according to claim 1 wherein the exterior surface of the main chamber comprises at least one aperture adapted to receive the second location of one of the ends of the sub-chamber to allow fluid communication between a fluid source exterior to the main chamber and the sub-chamber.

3. The tank according to claim 1 wherein the first end of the at least one sub-chamber is located adjacent an upper portion of the exterior surface of the main chamber and the second end of the at least one sub-chamber is located adjacent a lower portion of the exterior surface of the main chamber, the at least one sub-chamber defining a conduit traversing the main chamber from the upper portion to the lower portion of the exterior surface of the main chamber wherein the first and second ends are adapted to be simultaneously maintained in the open condition to allow fluid flow through the at least one sub-chamber for maintenance purposes of the at least one sub-chamber.

4. The tank according to claim 1 wherein the at least one sub-chamber is of cylindrical configuration.

5. The tank according to claim 1 wherein the at least one sub-chamber is adapted to reduce movement of the fluid within the main chamber.

6. The tank according claim 1 wherein the tank further comprises means for reducing movement of the fluid within the main chamber.

7. The tank according to claim 6 wherein the means for reducing movement of the fluid within the main chamber comprises plates joining the at least one sub-chamber with at least one wall of the main chamber.

8. The tank according to claim 7 further comprising a plurality of sub-chambers comprising the at least one sub-chamber, the plurality of sub-chambers being arranged in a spaced apart relationship with respect to each other within the main chamber, wherein the plates extend between adjacent sub-chambers defining a plurality of rows of sub-chambers joined together by plates.

9. The tank according to claim 8 wherein the plates are arranged at different locations with respect to the height of the plurality of sub-chambers defining a path to allow movement of maintenance personnel within the main chamber.

10. The tank according to claim 1 further comprising pre-fabricated items adapted for attachment to the tank so as to customise the tank to become a tank adapted to either incorporate a single fluid or to incorporate a plurality of fluids.

11. The tank according to claim 10 wherein the pre-fabricated item comprises a pre-fabricated water spraying bar.

12. The tank according to claim 10 wherein the pre-fabricated items comprise a pre-fabricated manifold and an attachment, the manifold comprising a plurality of conduits being adapted to be fluidly connected to the at least one second location of the exterior surface and the attachment defining a service area adapted to be in fluid communication with the manifold so as to deliver and receive fluid.

13. The tank according to claim 10 wherein the pre-fabricated items are adapted such that the plurality of conduits can be fluidly connected to the at least one second location of the exterior surface and the manifold can be fluidly connected to the service area via tubes, wherein all of the tubes have the same length.

14. The tank according to claim 13 wherein the length of the tubes is about 400 mm.

15. A service truck comprising a load carrying platform and a tank mounted on the load carrying platform, wherein the tank comprising a main chamber having an exterior surface defining an inner volume adapted to receive a first fluid, and at least one sub-chamber having first and second ends and a side wall having an exterior surface located within the inner volume of the main chamber, and an inner surface defining an inner volume within the at least one sub-chamber to store a second fluid, the side wall of the at least one sub-chamber having at least one first location comprising a first gate adapted to be selectively displaced between an open condition and a closed condition to either allow or impede flow of the first fluid into the inner volume of the at least one sub-chamber and each end of the at least one sub-chamber comprising a second location comprising a second gate adapted to be selectively displaced between an open condition and a closed condition to allow flow of the second fluid into the inner volume of the at least one sub-chamber, the at least one sub-chamber being arranged with respect to the main chamber such that the first location comprising the first gate is located within the main chamber and the second locations comprising the second gates are located exterior to the main chamber and the side wall of the at least one sub-chamber is located within the inner volume of the main chamber in order for the exterior surface of the side wall of the at least one sub-chamber to be surrounded by the first fluid wherein the service truck further comprises piping fluidly connected to the main chamber and the sub-chamber for either filling the main chamber with the first fluid and the sub-chamber with the second fluid or delivering the first fluid and the second fluid to delivery means for delivering the first fluid and the second fluid outside the main chamber and the sub-chamber to locations exterior to the service truck.

16. A method for assembling a tank adapted to either incorporate a first fluid or to incorporate the first fluid and a plurality of second fluids, the method comprising the steps of:

providing a tank structure comprising a main chamber having an exterior surface defining an inner volume adapted to receive the first fluid;

providing at least one sub-chamber comprising first and second ends and a side wall having an exterior surface located within the inner volume of the main chamber, and an inner surface defining an inner volume within the at least one sub-chamber to store a second fluid, the side wall at least one sub-chamber having at least one first gate adapted to be selectively displaced between an open condition and a closed condition to either allow or impede flow of the first fluid into the inner volume of the at least one sub-chamber, and each end comprising a second gate adapted to be selectively displaced between an open condition and a closed condition to either allow or impede flow of the second fluid of the plurality of second fluids into the inner volume of the at least one sub-chamber, and arranging the at least one sub-chamber within the main chamber such that at least one first location of the exterior surface comprising the first gate is located within the main chamber and the second locations of the ends of the sub-chamber comprising the second gates are located exterior to the main chamber and the side wall of the at least one sub-chamber is located within the inner volume of the main chamber in order for the exterior surface of the side wall of the at least one sub-chamber to be surrounded by the first fluid, the at least one first gate is displaced into the closed condition if the tank is to incorporate the first fluid and a plurality of second fluids, or the first gate is displaced into the open condition if the tank is to incorporate only the first fluid, and attaching pre-fabricated items to the tank so as to customise the tank to become a tank adapted to either incorporate a single fluid or to incorporate a plurality of fluids.

* * * * *